(12) United States Patent
Akiyama

(10) Patent No.: US 11,480,862 B2
(45) Date of Patent: Oct. 25, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/477,021

(22) Filed: Sep. 16, 2021

(65) Prior Publication Data

US 2022/0082922 A1 Mar. 17, 2022

(30) Foreign Application Priority Data

Sep. 17, 2020 (JP) .............................. JP2020-156176

(51) Int. Cl.

| | | |
|---|---|---|
| *G03B 21/20* | (2006.01) | |
| *G02F 1/1335* | (2006.01) | |
| *G03B 33/12* | (2006.01) | |
| *G02B 27/28* | (2006.01) | |
| *G02B 5/30* | (2006.01) | |
| *H04N 9/31* | (2006.01) | |
| *G02B 27/14* | (2006.01) | |
| *G02B 5/02* | (2006.01) | |
| *G03B 21/00* | (2006.01) | |

(52) U.S. Cl.
CPC ....... *G03B 21/2073* (2013.01); *G02B 5/0205* (2013.01); *G02B 27/283* (2013.01); *G03B 21/006* (2013.01); *G03B 21/204* (2013.01); *G03B 21/208* (2013.01); *G03B 33/12* (2013.01)

(58) Field of Classification Search
CPC .............. G03B 21/204; G03B 21/2073; G03B 21/208; G02B 5/0205; G02B 27/283
USPC .......................................................... 353/20
See application file for complete search history.

(56) References Cited

U.S. PATENT DOCUMENTS

| | | | |
|---|---|---|---|
| 5,161,042 A | 11/1992 | Hamada | |
| 10,444,611 B2 * | 10/2019 | Pan ....................... | G03B 21/204 |
| 10,915,014 B1 | 2/2021 | Akiyama | |

(Continued)

FOREIGN PATENT DOCUMENTS

| | | |
|---|---|---|
| JP | H04-060538 A | 2/1992 |
| JP | 2005-321502 A | 11/2005 |

(Continued)

*Primary Examiner* — Jerry L Brooks
(74) *Attorney, Agent, or Firm* — Oliff PLC

(57) ABSTRACT

A light source device includes a light source, a first polarization split element for transmitting first light from the light source which is polarized in a first polarization direction and reflecting the first light polarized in a second polarization direction, a first optical element for reflecting the first light from the first polarization split element, a diffusion element for diffusing the first light from the first polarization split element, a wavelength conversion element for performing wavelength conversion on the first light from the first optical element to emit second light, a second polarization split element which the second light enters from the first optical element, and which transmits the second light polarized in the first polarization direction and reflects the second light polarized in the second polarization direction, and a second optical element for reflecting the second light from the second polarization split element, polarized in the second polarization direction.

11 Claims, 15 Drawing Sheets

(56) References Cited

U.S. PATENT DOCUMENTS

| | | |
|---|---|---|
| 2005/0248736 A1 | 11/2005 | Itoh |
| 2008/0062386 A1 | 3/2008 | Ito |
| 2013/0027670 A1 | 1/2013 | Akiyama et al. |
| 2020/0201155 A1 | 6/2020 | Akiyama |
| 2020/0249555 A1 | 8/2020 | Akiyama |
| 2020/0252589 A1 | 8/2020 | Akiyama |
| 2020/0314397 A1 | 10/2020 | Akiyama |

FOREIGN PATENT DOCUMENTS

| | | |
|---|---|---|
| JP | 2008-065250 A | 3/2008 |
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |

* cited by examiner

LIGHT SOURCE DEVICE AND PROJECTOR

The present application is based on, and claims priority from JP Application Serial Number 2020-156176, filed Sep. 17, 2020, the disclosure of which is hereby incorporated by reference herein in its entirety.

BACKGROUND

1. Technical Field

The present disclosure relates to a light source device and a projector.

2. Related Art

There has been known a projector which modulates light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed at the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniforming the polarization directions of the plurality of partial light beams between the white light source and the liquid crystal display element as a device for homogenously illuminating the liquid crystal display element. In this case, there is generally used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams uniformed in polarization direction without using the polarization conversion element narrow in pitch.

SUMMARY

In view of the problems described above, a light source device according to an aspect of the present disclosure includes a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction, a first optical element disposed at the first direction side of the first polarization split element, and configured to reflect the first light beam which enters the first optical element along the first direction from the first polarization split element toward the second direction, a diffusion element disposed at the second direction side of the first polarization split element, and configured to diffuse the first light beam which enters the diffusion element along the second direction from the first polarization split element, and emit the first light beam diffused toward a third direction as an opposite direction to the second direction, a wavelength conversion element disposed at the second direction side of the first optical element, configured to perform wavelength conversion on the first light beam which enters the wavelength conversion element along the second direction from the first optical element, and configured to emit a second light beam having a second wavelength band different from the first wavelength band toward the third direction, a second polarization split element which is disposed at the third direction side of the first optical element, which the second light beam enters along the third direction from the first optical element, and which is configured to transmit the second light beam polarized in the first polarization direction toward the third direction, and reflect the second light beam polarized in the second polarization direction toward a fourth direction as an opposite direction to the first direction, and a second optical element disposed at the fourth direction side of the second polarization split element, and configured to reflect the second light beam which enters the second optical element along the fourth direction from the second polarization split element, and is polarized in the second polarization direction, toward the third direction, wherein the first polarization split element transmits the first light beam which enters the first polarization split element along the third direction from the diffusion element toward the third direction, the first optical element transmits the second light beam which enters the first optical element along the third direction from the wavelength conversion element toward the third direction, and the second optical element transmits the first light beam which enters the second optical element along the third direction from the first polarization split element toward the third direction.

A light source device according to another aspect of the present disclosure includes a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction, a first optical element disposed at the first direction side of the first polarization split element, and configured to reflect the first light beam which enters the first optical element along the first direction from the first polarization split element toward the second direction, a diffusion element disposed at the second direction side of the first optical element, and configured to diffuse the first light beam which enters the diffusion element along the second direction from the first optical element, and emit the first light beam diffused toward a third direction as an opposite direction to the second direction, a wavelength conversion element disposed at the second direction side of the first polarization split element, configured to perform wavelength conversion on the first light beam which enters the wavelength conversion element along the second direction from the first polarization split element, and configured to emit a second light beam having a second wavelength band different from the first wavelength band toward the third direction, a second polarization split element which is disposed at the third direction side of the first polarization split element, which the second light beam enters along the third direction from the first polarization split element, and which is configured to transmit the second light beam polarized in the first polarization direction toward the third direction, and reflect the second light beam polarized in the second polarization direction toward the first direction, and a second optical element disposed at the first direction side of the second polarization split element, and configured to reflect the second light beam which enters the second optical element along the first direction from the second polarization split element, and is polarized in the second polarization direction, toward the third direction, wherein the first optical element transmits the first light beam which enters the first optical element along the third direction from the diffusion element toward the third direction, the first polarization split element transmits the second light beam which enters the first polarization split element along the third direction from the wavelength conversion element toward the third direction, and the second optical element transmits the first light beam which enters the second optical element along the third direction from the first optical element toward the third direction.

A projector according to an aspect of the present disclosure includes the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 7.

Figure 1:
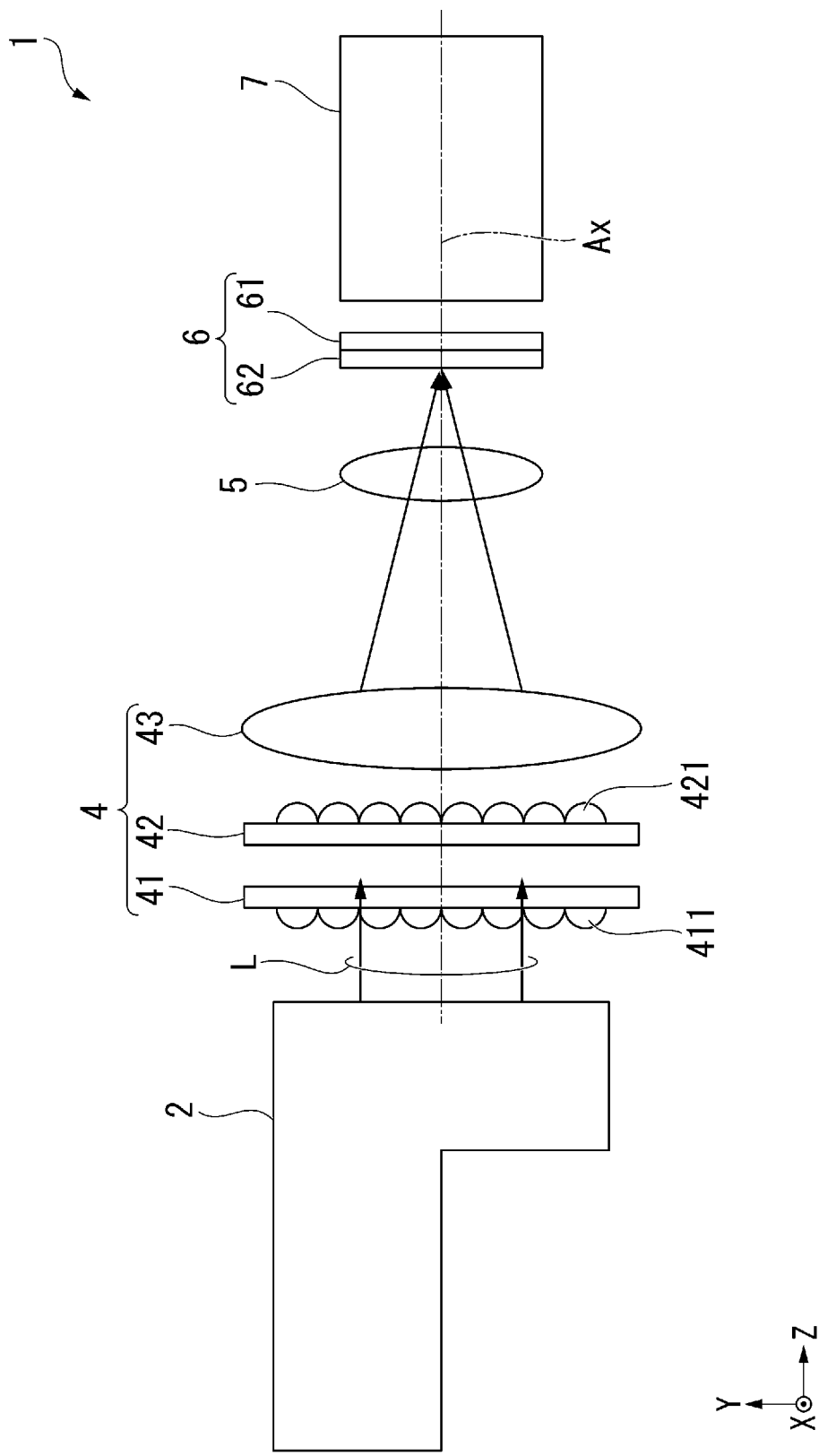
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to make each of the constituents eye-friendly.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with the light source device 2, a homogenization device 4, a field lens 5, the light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims. The −Z direction in the present embodiment corresponds to a second direction in the appended claims. The +Z direction in the present embodiment corresponds to a third direction in the appended claims. The −X direction in the present embodiment corresponds to a fourth direction in the appended claims.

Configuration of Light Source Device

Figure 2:
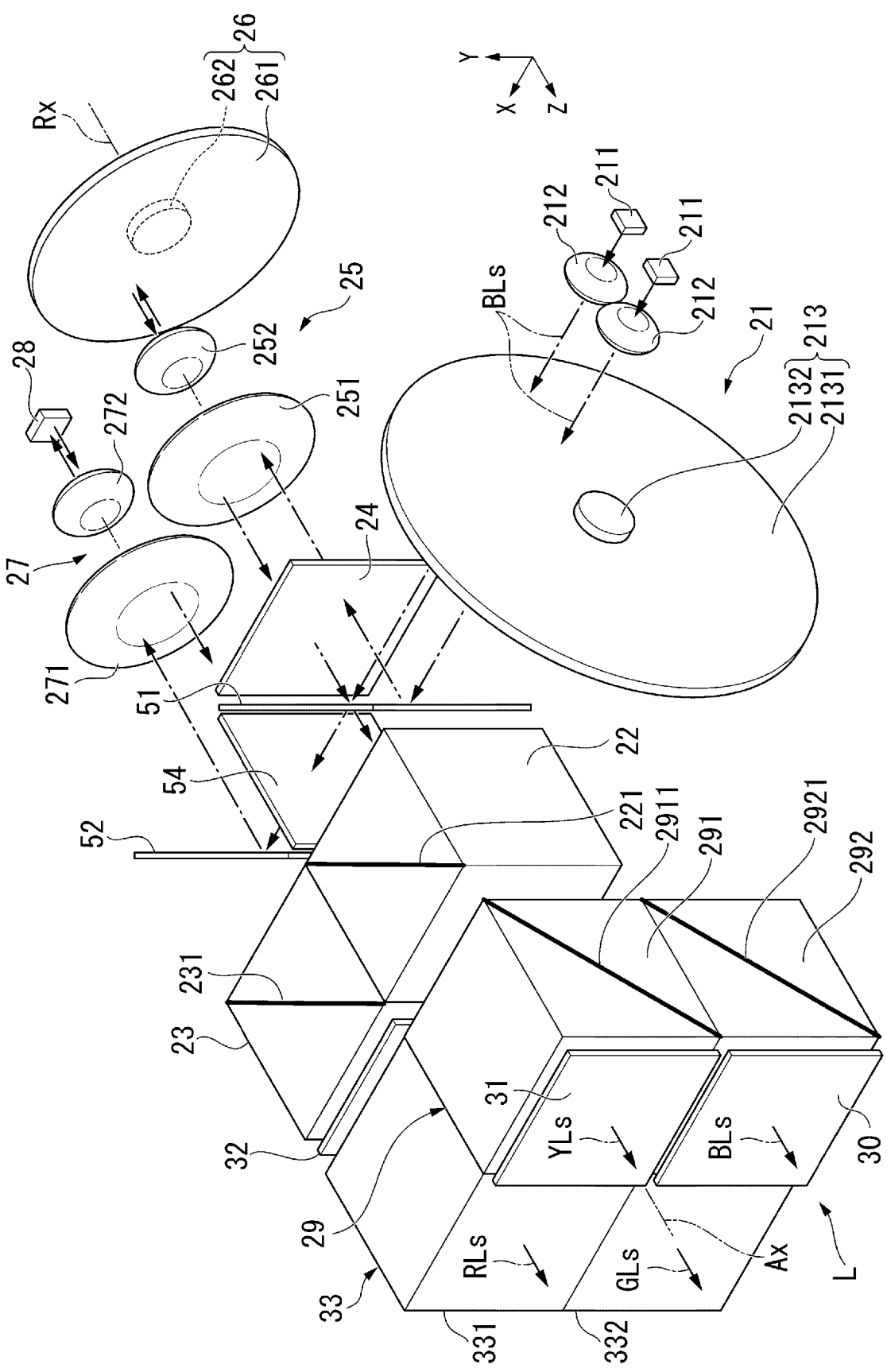
FIG. 2 is a perspective view of a light source device according to the first embodiment.
Figure 3:
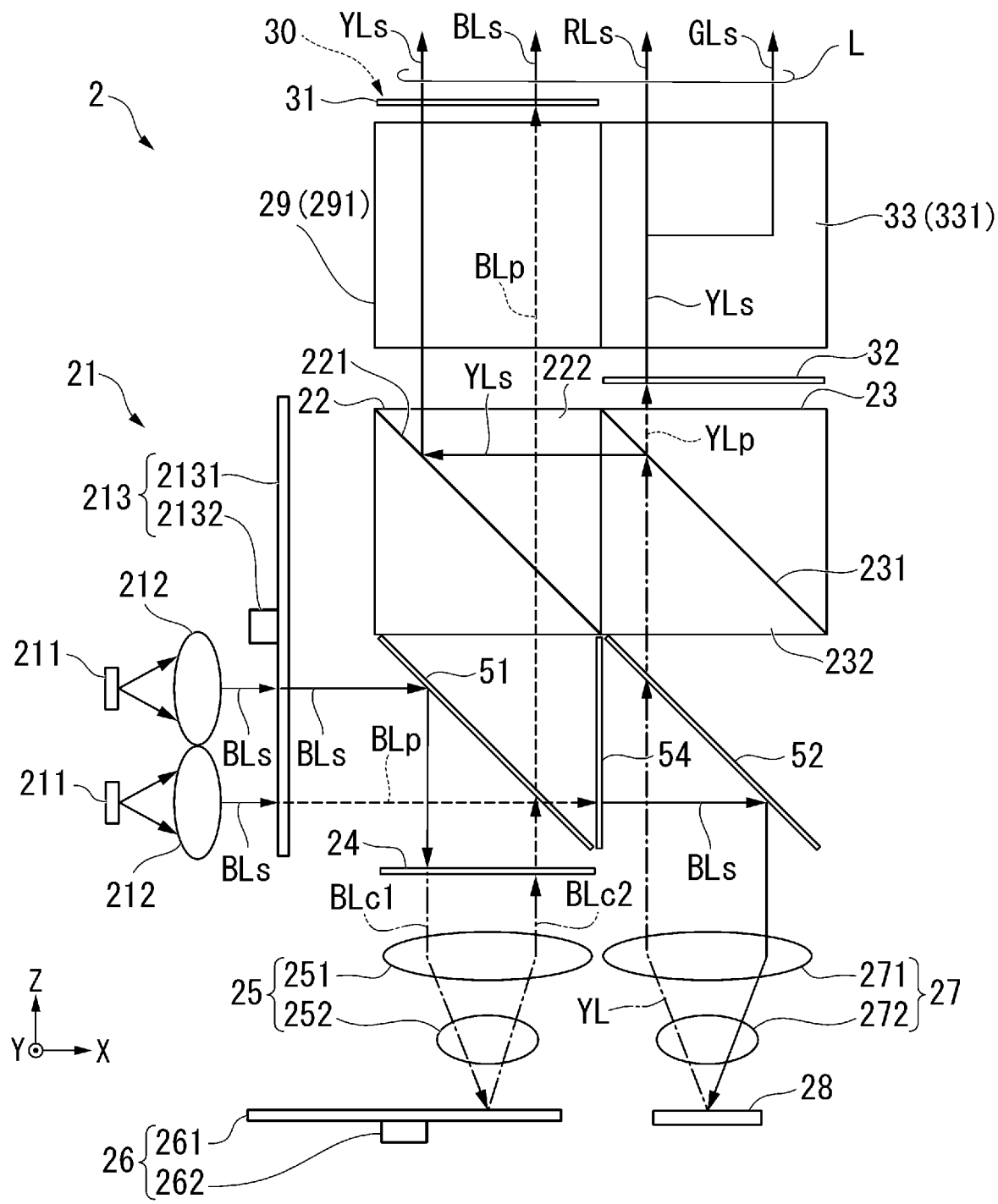
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L for illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of S-polarized light. The four light beams correspond to a blue light beam BLs, a yellow light beam YLs, a green light beam GLs, and a red light beam RLs.

The light source device 2 is provided with a light source section 21, a first polarization split element 51, a third retardation element 54, a first optical element 52, a second polarization split element 23, a second optical element 22, a first retardation element 24, a first light collection element 25, a diffusion device 26, a second light collection element 27, a wavelength conversion element 28, a fourth retardation element 32, a first color separation element 29, a fifth retardation element 30, a reflecting element 31, and a second color separation element 33.

It should be noted that the P-polarized light in the present embodiment corresponds to light polarized in a first polarization direction in the appended claims. The S-polarized light in the present embodiment corresponds to light polarized in a second polarization direction in the appended claims. Further, as described later, the first polarization split element 51, the first optical element 52, the second polarization split element 23, and the second optical element 22 are different in orientation of a film for separating the polarization components or colored light beams from the first color separation element 29 and the second color separation element 33. Therefore, the descriptions of P-polarized light and S-polarized light in the present embodiment represent the polarization direction with respect to the first polarization split element 51, the first optical element 52, the second polarization split element 23, and the second optical element 22, and are reversed in the polarization direction with respect to the first color separation element 29 and the second color separation element 33.

In other words, the P-polarized light with respect to the first polarization split element 51, the first optical element 52, the second polarization split element 23, and the second optical element 22 corresponds to the S-polarized light with respect to the first color separation element 29 and the second color separation element 33. The S-polarized light with respect to the first polarization split element 51, the first optical element 52, the second polarization split element 23, and the second optical element 22 corresponds to the P-polarized light with respect to the first color separation element 29 and the second color separation element 33. It should be noted that since there is a possibility that the description gets confusing when changing the name of one type of light in accordance with the element which the polarized light enters, the P-polarized light and the S-polarized light are hereinafter described as the polarization direction with respect to the first polarization split element 51, the first optical element 52, the second polarization split element 23, and the second optical element 22 without changing the name of the polarized light in accordance with the element which these types of polarized light enter.

Further, in each of the drawings, the P-polarized light is represented by a dotted-line arrow, the S-polarized light is represented by a solid arrow, and light in other polarization states than the P-polarized light and the S-polarized light is represented by a dashed-dotted-line arrow.

Configuration of Light Source Section

The light source section 21 emits the blue light beams BLs, BLp which enter the first polarization split element 51 along the +X direction. The light source section 21 has a plurality of light emitting elements 211, a plurality of collimator lenses 212, and a rotary retardation device 213. The light emitting elements 211 are each formed of a solid-state light source for emitting the blue light beam BLs. Specifically, the light emitting elements 211 are each formed of a semiconductor laser for emitting the blue light beam BLs as the S-polarized light. The blue light beam BLs is a laser beam having a blue wavelength band of, for example, 440 through 480 nm, and having a peak wavelength within a range of, for example, 450 through 460 nm. The blue wavelength band in the present embodiment corresponds to a first wavelength band in the appended claims. The blue light beams BLs, BLp in the present embodiment correspond to a first light beam in the appended claims.

In the case of the present embodiment, the plurality of light emitting elements 211 is arranged along the Z axis. Although the light source section 21 in the present embodiment has two light emitting elements 211, the number of the light emitting elements 211 is not limited, and the number of the light emitting elements 211 can be one. Further, the arrangement of the plurality of light emitting elements 211 is not limited as well. Further, the light emitting elements 211 are arranged so as to emit the blue light beams BLs as the S-polarized light, but can be arranged so as to emit the blue light beams as the P-polarized light since a light intensity ratio between the S-polarized light and the P-polarized light can arbitrarily be set by the rotary retardation device 213. In other words, it is possible for the light emitting elements 211 to rotate as much as 90° centering on the emission optical axis.

The plurality of collimator lenses 212 is disposed between the plurality of light emitting elements 211 and the rotary retardation device 213. The collimator lenses 212 are disposed so as to correspond one-to-one to the light emitting elements 211. The collimator lens 212 collimates the light beam BLs emitted from the light emitting element 211.

The rotary retardation device 213 has a second retardation element 2131, and a rotation device 2132. The second retardation element 2131 is made rotatable centering on a rotational axis along a proceeding direction of the light entering the second retardation element 2131, namely a rotational axis parallel to the X axis. The rotation device 2132 is formed of a motor and so on, and rotates the second retardation element 2131.

The second retardation element 2131 is formed of a ½ wave plate or a ¼ wave plate with respect to the blue wavelength band. A part of the blue light beam BLs as the S-polarized light having entered the second retardation element 2131 is converted into the blue light beam BLp as the P-polarized light by the second retardation element 2131. Therefore, the blue light beam having been transmitted through the second retardation element 2131 turns to light in which the blue light beam BLs as the S-polarized light and the blue light beam BLp as the P-polarized light mixed with each other with a predetermined ratio. Specifically, the blue light beams BLs as the S-polarized light emitted from the light emitting elements 211 enter the second retardation element 2131, and the blue light including the blue light beam BLs as the S-polarized light and the blue light beam BLp as the P-polarized light is emitted from the second retardation element 2131.

By the rotation device 2132 adjusting the rotational angle of the second retardation element 2131, there is adjusted the ratio between the light intensity of the blue light beam BLs as the S-polarized light included in the light beam having been transmitted through the second retardation element 2131 and the light intensity of the blue light beam BLp as the P-polarized light included in the light beam having been transmitted through the second retardation element 2131. It should be noted that when there is no need to adjust the ratio between the light intensity of the blue light beam BLs and the light intensity of the blue light beam BLp, the rotation device 2132 for rotating the second retardation element 2131 is not required to be disposed. In that case, the rotational angle of the second retardation element 2131 is set so that the ratio between the light intensity of the blue light beam BLs and the light intensity of the blue light beam BLp becomes a predetermined light intensity ratio, and then the rotational position of the second retardation element 2131 is fixed.

In such a manner, the light source section 21 emits the blue light including the blue light beam BLs as the S-polarized light and the blue light beam BLp as the P-polarized light. It should be noted that in the present embodiment, there is adopted the configuration in which all of the light emitting elements 211 emit the blue light beam BLs as the S-polarized light, but it is possible to adopt a configuration in which the light emitting element 211 for emitting the blue light beam BLs as the S-polarized light and the light emitting element 211 for emitting the blue light beam BLp as the P-polarized light are mixed. According to this configuration, it is also possible to omit the rotary retardation device 213. Further, it is also possible for the light emitting element 211 to be formed of another solid-state light source such as an LED (Light Emitting Diode) instead of the semiconductor laser.

Configuration of First Polarization Split Element

The blue light including the blue light beam BLs as the S-polarized light and the blue light beam BLp as the P-polarized light emitted from the light source section 21 enter the first polarization split element 51 along the +X direction. Although the detailed illustration will be omitted, the first polarization split element 51 is constituted by a substrate, and an optical film formed on one surface of the substrate. Specifically, the first polarization split element 51 according to the present embodiment is formed of a plate type optical element. The substrate is formed of, for example, general optical glass. The optical film is formed of, for example, a dielectric multilayer film.

The optical film has a characteristic of transmitting the P-polarized light and reflecting the S-polarized light with respect to the light in the blue wavelength band. In other words, the optical film has a polarization split characteristic with respect to the blue light. The substrate is disposed so as to be tilted 45° with respect to the X axis and the Z axis. In other words, the substrate is disposed so as to be tilted 45° with respect to an X-Y plane and a Y-Z plane. Therefore, the first polarization split element 51 transmits the blue light beam BLp as the P-polarized light which enters the first polarization split element 51 along the +X direction from the light source section 21 toward the +X direction, and reflects the blue light beam BLs as the S-polarized light which enters the first polarization split element 51 along the +X direction toward the −Z direction. Further, as described later, the blue light beam BLp which enters the first polarization split element 51 along the +Z direction from a diffusion plate 261 is transmitted by the first polarization split element 51 toward the +Z direction.

It should be noted that there is no chance for the yellow light beam YL emitted from the wavelength conversion element 28 to enter the first polarization split element 51. Therefore, it is sufficient for the first polarization split element 51 to have a polarization split characteristic with respect to the light in the blue wavelength band, and the characteristic with respect to light in a wavelength band including the green wavelength band and the red wavelength band is not limited. Further, the first polarization split element 51 can be constituted by two base members each having an isosceles right triangular prismatic shape, and an optical film disposed between tilted surfaces opposed to each other of the two base members. Specifically, the first polarization split element 51 can be formed of a prism type optical element.

Configuration of Third Retardation Element

The third retardation element 54 is disposed at the +X direction side of the first polarization split element 51. In other words, the third retardation element 54 is disposed between the first polarization split element 51 and the first optical element 52 on the X axis. The third retardation element 54 is formed of a ½ wave plate with respect to the blue wavelength band which the blue light beam BLp emitted from the first polarization split element 51 has. Thus, the blue light beam BLp as the P-polarized light emitted along the +X direction from the first polarization split element 51 is converted by the third retardation element 54 into the blue light beam BLs as the S-polarized light. It should be noted that in the present embodiment, the third retardation element 54 is not necessarily required to be disposed.

Configuration of First Optical Element

The first optical element 52 is disposed at the +X direction side of the first polarization split element 51. The blue light beam BLs as the S-polarized light which has been emitted from the first polarization split element 51, and the polarization direction of which has been converted by the third retardation element 54 enters the first optical element 52 along the +X direction. Although the detailed illustration will be omitted, the first optical element 52 is constituted by a substrate, and an optical film formed on one surface of the substrate. Specifically, the first optical element 52 in the present embodiment is formed of a plate type optical element. The substrate is formed of, for example, general optical glass. The optical film is formed of, for example, a dielectric multilayer film.

The optical film has a characteristic of reflecting the S-polarized light with respect to the light in the blue wavelength band, and transmitting light in a wavelength band including the green wavelength band and the red wavelength band irrespective of the polarization direction. The substrate is disposed so as to be tilted 45° with respect to the X axis and the Z axis. In other words, the substrate is disposed so as to be tilted 45° with respect to the X-Y plane and the Y-Z plane. Therefore, the blue light beam BLs as the S-polarized light which enters the first optical element 52 along the +X direction from the first polarization split element 51 is reflected by the first optical element 52 toward the −Z direction. Further, the yellow light beam YL which enters the first optical element 52 along the +Z direction from the wavelength conversion element 28 is transmitted by the first optical element 52 toward the +Z direction.

It should be noted that since it is sufficient for the first optical element 52 to reflect at least the S-polarized light with respect to the light in the blue wavelength band, it is possible for the first optical element 52 to transmit the P-polarized light or to reflect the P-polarized light. Therefore, it is possible for the first optical element 52 to have a polarization split characteristic of reflecting the S-polarized light and transmitting the P-polarized light with respect to the light in the blue wavelength band, and a characteristic of transmitting the light in the wavelength band including the green wavelength band and the red wavelength band. Alternatively, it is possible for the first optical element to have a characteristic of reflecting both of the S-polarized light and the P-polarized light with respect to the light in the blue wavelength band, and transmitting the light in the wavelength band including the green wavelength band and the red wavelength band.

In the case of the present embodiment, since the third retardation element 54 is provided, the blue light beam BLs as the S-polarized light enters the first optical element 52. Therefore, it is possible for the first optical element 52 to have any one of the two types of characteristic described above. It should be noted that when the third retardation element 54 is not provided unlike the configuration of the present embodiment, the blue light beam BLp as the P-polarized light having been transmitted through the first polarization split element 51 directly enters the first optical element 52. Therefore, it is necessary for the first optical element 52 to reflect the P-polarized light with respect to the light in the blue wavelength band. In this case, it is sufficient for the first optical element 52 to be formed of a dichroic mirror for reflecting the light in the blue wavelength band, and transmitting the light in the wavelength band including the green wavelength band and the red wavelength band.

Configuration of Second Polarization Split Element

The second polarization split element 23 is disposed at the +Z direction side of the first optical element 52. The yellow light beam YL having been transmitted through the first optical element 52 enters the second polarization split element 23 along the +Z direction. The second polarization split element 23 is formed of a prism type polarization split element. The second polarization split element 23 has two base members 232 and a polarization split layer 231 disposed between the two base members 232.

Specifically, each of the two base members 232 has a substantially isosceles right triangular prismatic shape. The two base members 232 are combined with each other so that the tilted surfaces are opposed to each other, and are formed to have a substantially rectangular solid shape as a whole. The polarization split layer 231 is disposed between the tilted surfaces of the two base members 232. The polarization split layer 231 is tilted 45° with respect to the X axis and the Z axis. In other words, the polarization split layer 231 is tilted 45° with respect to the X-Y plane and the Y-Z plane. Further, the polarization split layer 231 is disposed in parallel to the first optical element 52.

The polarization split layer 231 has a polarization split characteristic of reflecting the S-polarized light and transmitting the P-polarized light with respect to the light in the wavelength band including the green wavelength band and the red wavelength band. Therefore, the yellow light beam YL enters the second polarization split element 23 along the +Z direction from the first optical element 52, and the second polarization split element 23 transmits the yellow light beam YLp as the P-polarized light toward the +Z direction, and reflects the yellow light beam YLs as the S-polarized light toward the −X direction. The polarization split layer 231 is formed of, for example, a dielectric multilayer film. The base members 232 are each formed of general optical glass. It should be noted that there is no chance for the blue light beams BLp, BLs to enter the second polarization split element 23. Therefore, it is sufficient for the second polarization split element 53 to have a polarization split characteristic with respect to the light in the wavelength band including the green wavelength band and the red wavelength band, and the characteristic with respect to the light in the blue wavelength band is not limited.

Configuration of Second Optical Element

The second optical element 22 is disposed at the −X direction side of the second polarization split element 23. Further, the second optical element 22 is disposed at the +Z direction side of the first polarization split element 51. The yellow light beam YLs emitted from the second polarization split element 23 enters the second optical element 22 along the −X direction. Further, the blue light beam BLp emitted from the first polarization split element 51 enters the second optical element 22 along the +Z direction. The second optical element 22 is formed of a prism type polarization split element. The second optical element 22 has two base members 222 and an optical layer 221 disposed between the two base members 222.

Specifically, each of the two base members 222 has a substantially isosceles right triangular prismatic shape. The two base members 222 are combined with each other so that the tilted surfaces are opposed to each other, and are formed to have a substantially rectangular solid shape as a whole. The optical layer 221 is disposed between the tilted surfaces of the two base members 222. The optical layer 221 is tilted 45° with respect to the X axis and the Z axis. In other words, the optical layer 221 is tilted 45° with respect to the X-Y plane and the Y-Z plane. Further, the optical layer 221 is disposed in parallel to the polarization split layer 231 and the first polarization split element 51.

The optical layer 221 has a characteristic of transmitting at least the P-polarized light with respect to the light in the blue wavelength band, and reflecting at least the S-polarized light with respect to the light in the wavelength band including the green wavelength band and the red wavelength band. Thus, the yellow light beam YLs as the S-polarized light which enters the second optical element 22 along the −X direction from the second polarization split element 23 is reflected by the second optical element 22 toward the −X direction. Further, the blue light beam BLp as the P-polarized light which enters the second optical element 22 along the +Z direction from the first polarization split element 51 is transmitted by the second optical element 22 toward the +Z direction. The optical layer 221 is formed of, for example, a dielectric multilayer film. The base members 222 are each formed of general optical glass.

It should be noted that since it is sufficient for the second optical element 22 to transmit at least the P-polarized light with respect to the light in the blue wavelength band, it is possible for the second optical element to transmit the S-polarized light or to reflect the S-polarized light. Further, since it is sufficient for the second optical element 22 to reflect at least the S-polarized light with respect to the light in the wavelength band including the green wavelength band and the red wavelength band, it is possible for the second optical element 22 to transmit the P-polarized light or to reflect the P-polarized light. Therefore, it is possible for the second optical element 22 to have a polarization split characteristic of transmitting the P-polarized light with respect to the light in the blue wavelength band, and transmitting the P-polarized light and reflecting the S-polarized light with respect to the light in the wavelength band including the green wavelength band and the red wavelength band. Alternatively, it is possible for the second optical element 22 to have a polarization split characteristic of transmitting the P-polarized light and reflecting the S-polarized light with respect to the light in the entire wavelength band in the visible range.

Configuration of First Retardation Element

The first retardation element 24 is disposed at the −Z direction side of the first polarization split element 51. Specifically, the first retardation element 24 is disposed between the first polarization split element 51 and the diffusion plate 261 on the Z axis. The first retardation element 24 is formed of a ¼ wave plate with respect to the blue wavelength band of the blue light beam BLs which enters the first retardation element 24. The blue light beam BLs as the S-polarized light having been reflected by the first polarization split element 51 is converted by the first retardation element 24 into, for example, a blue light beam BLc1 as clockwise circularly polarized light, and is then emitted toward the first light collection element 25. In such a manner, the blue light beam BLs as the S-polarized light emitted along the −Z direction from the first polarization split element 51 enters the first retardation element 24, and the first retardation element 24 converts the polarization state of the blue light beam BLs from the linearly polarized light into the circularly polarized light.

Configuration of First Light Collection Element

The first light collection element 25 is disposed at the −Z direction side of the first retardation element 24. Specifically, the first light collection element 25 is disposed between the first retardation element 24 and the diffusion plate 261 on the Z axis. The first light collection element 25 converges the blue light beam BLc1 which enters the first light collection element 25 from the first retardation element 24 on the diffusion plate 261. Further, the first light collection element 25 collimates a blue light beam BLc2 described later which enters the first light collection element 25 from the diffusion plate 261, and then emits the result toward the first retardation element 24. In the example shown in FIG. 3, the first light collection element 25 is constituted by two convex lenses, namely a first lens 251 and a second lens 252. It should be noted that the number of the lenses constituting the first light collection element 25 is not particularly limited.

Configuration of Diffusion Device

The diffusion device 26 is disposed at the −Z direction side of the first light collection element 25. In other words, the diffusion device 26 is disposed at the −Z direction side of the first polarization split element 51. The diffusion device 26 diffuses the blue light beam BLc1 which enters the diffusion device 26 along the −Z direction from the first polarization split element 51 via the first retardation element 24 and the first light collection element 25 so that the diffusion angle becomes equivalent to that of the yellow light beam YL which is emitted from the wavelength conversion element 28 described later, and then emits the result toward the +Z direction.

The diffusion device 26 is provided with the diffusion plate 261 and a rotation device 262. The diffusion plate 261 preferably has a reflection characteristic as close to the Lambertian scattering as possible, and reflects the blue light beam BLc1 having entered the diffusion plate 261 in a wide-angle manner. The rotation device 262 is formed of a motor and so on, and rotates the diffusion plate 261 centering on a rotational axis Rx parallel to the Z axis.

The diffusion plate 261 in the present embodiment corresponds to a diffusion element in the appended claims.

The blue light beam BLc1 having entered the diffusion plate 261 is reflected by the diffusion plate 261 to thereby be converted into the blue light beam BLc2 as circularly polarized light having an opposite rotational direction. In other words, the blue light beam BLc1 as the clockwise circularly polarized light is converted by the diffusion plate 261 into the blue light beam BLc2 as counterclockwise circularly polarized light. The blue light beam BLc2 emitted from the diffusion device 26 passes the first light collection element 25 toward the +Z direction, and then enters the first retardation element 24 once again. On this occasion, the blue light beam BLc2 which enters the first retardation element 24 from the first light collection element 25 is converted by the first retardation element 24 into the blue light beam BLp as the P-polarized light. The blue light beam BLp as the P-polarized light is transmitted through the first polarization split element 51 toward the +Z direction, transmitted through the second optical element toward the +Z direction, and then enters the first color separation element 29.

Configuration of Second Light Collection Element

The second light collection element 27 is disposed at the −Z direction side of the first optical element 52. Specifically, the second light collection element 27 is disposed between the first optical element 52 and the wavelength conversion element 28 on the Z axis. The second light collection element 27 converges the blue light beam BLs as the S-polarized light reflected by the first optical element 52 on the wavelength conversion element 28. Further, the second light collection element 27 collimates the yellow light beam YL which is emitted from the wavelength conversion element 28 and is described later, and then emits the result toward the first optical element 52. In the example shown in FIG. 3, the second light collection element 27 is constituted by two convex lenses, namely a first lens 271 and a second lens 272. It should be noted that the number of the lenses constituting the second light collection element 27 is not particularly limited.

Configuration of Wavelength Conversion Element

The wavelength conversion element 28 is disposed at the −Z direction side of the second light collection element 27. In other words, the wavelength conversion element 28 is disposed at the −Z direction side of the first optical element 52. The wavelength conversion element 28 is a reflective wavelength conversion element which is excited by the light entering the wavelength conversion element, and emits light having a different wavelength band from the wavelength band of the light having entered the wavelength conversion element 28 toward an opposite direction to the incident direction of the light. In other words, the wavelength conversion element 28 performs the wavelength conversion on the light which enters the wavelength conversion element 28, and then emits the light on which the wavelength conversion has been performed toward the opposite direction to the incident direction of the light.

In the present embodiment, the wavelength conversion element 28 includes a yellow phosphor which is excited by blue light and emits yellow light. Specifically, the wavelength conversion element 28 includes, for example, an yttrium aluminum garnet (YAG) type phosphor containing cerium (Ce) as an activator. The wavelength conversion element 28 emits fluorescence having a wavelength band longer than the blue wavelength band of the blue light beam BLs entering the wavelength conversion element 28 along the −Z direction, namely the yellow light beam YL as unpolarized light, toward the +Z direction. The yellow light beam YL has a wavelength band of, for example, 500 through 650 nm. The yellow light beam YL is light having a wavelength band including the green wavelength band and the red wavelength band. Therefore, the wavelength conversion element 28 performs the wavelength conversion on the blue light beam BLs as the S-polarized light which enters the wavelength conversion element 28 along the −Z direction from the first optical element 52, and emits the yellow light beam YL having a wavelength band including the green wavelength band and the red wavelength band different from the blue wavelength band toward the +Z direction as an opposite direction to the −Z direction.

The yellow light beam YL having the wavelength band including the green wavelength band and the red wavelength band in the present embodiment, namely the yellow light beam YL as the unpolarized light, corresponds to a second light beam having a second wavelength band in the appended claims.

The yellow light beam YL emitted from the wavelength conversion element 28 is transmitted through the second light collection element 27 along the +Z direction to thereby be collimated, and then enters the first optical element 52. Since the first optical element 52 has a characteristic of transmitting the light in the wavelength band including the green wavelength band and the red wavelength band, the yellow light beam YL is transmitted through the first optical element 52 along the +Z direction to enter the second polarization split element 23.

It should be noted that the wavelength conversion element 28 in the present embodiment is a stationary wavelength conversion element, but instead of this configuration, it is possible to use a rotary wavelength conversion element provided with a rotation device for rotating the wavelength conversion element 28 centering on a rotational axis parallel to the Z axis. When using the rotary wavelength conversion element, a rise in temperature of the wavelength conversion element 28 is suppressed, and thus, it is possible to increase the wavelength conversion efficiency.

As described above, the polarization split layer 231 of the second polarization split element 23 has a polarization split characteristic of reflecting the S-polarized light and transmitting the P-polarized light with respect to the light in the wavelength band including the green wavelength band and the red wavelength band. Therefore, out of the yellow light beam YL as the unpolarized light having entered the second polarization split element 23, the yellow light beam YLs as the S-polarized light is reflected by the polarization split layer 231 toward the −X direction, and then enters the second optical element 22. The yellow light beam YLs as the S-polarized light having entered the second optical element 22 is reflected by the second optical element 22 toward the +Z direction to enter the first color separation element 29.

Meanwhile, out of the yellow light beam YL as the unpolarized light having entered the second polarization split element 23, the yellow light beam YLp as the P-polarized light is transmitted through the polarization split layer 231 toward the +Z direction to be emitted from the second polarization split element 23, and then enters the second color separation element 33 via the fourth retardation element 32.

It should be noted that the yellow light beam YLp as the P-polarized light in the present embodiment corresponds to the second light beam polarized in the first polarization direction in the appended claims. The yellow light beam YLs as the S-polarized light corresponds to the second light beam polarized in the second polarization direction in the appended claims.

Configuration of First Color Separation Element

Figure 4:
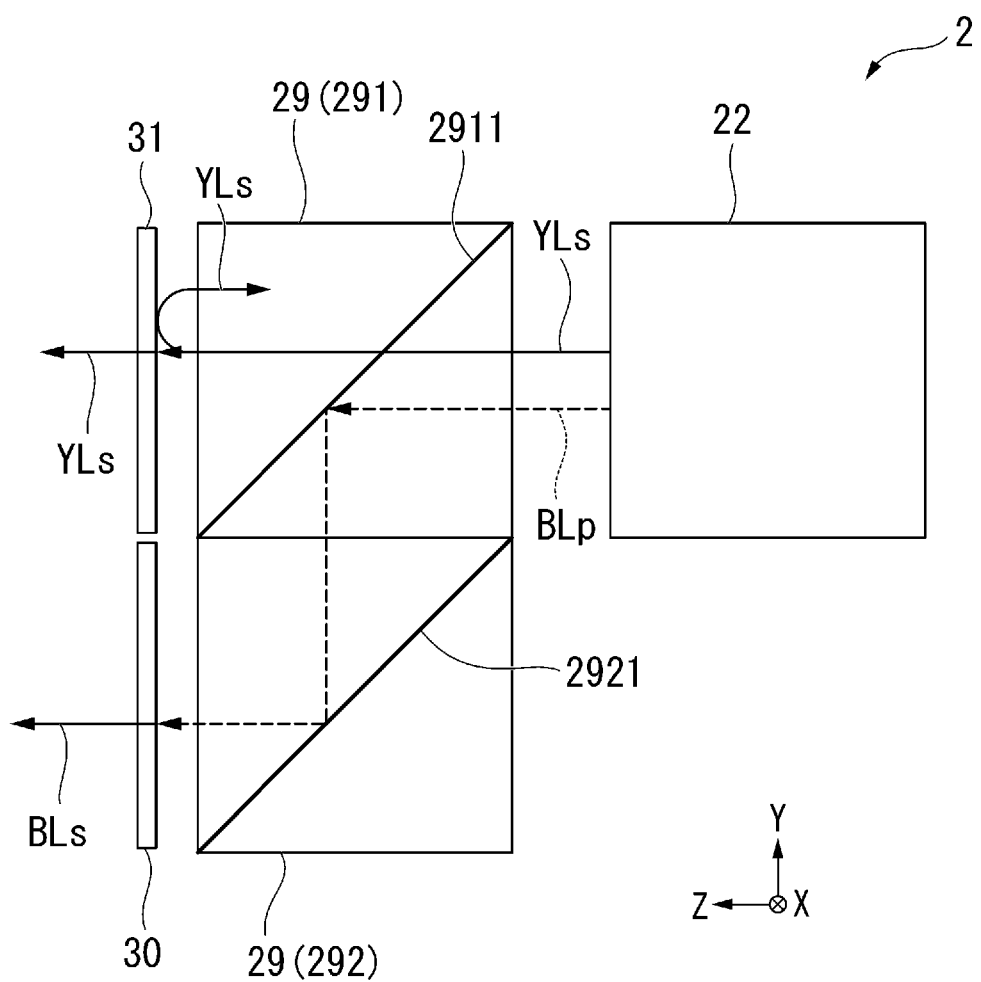
FIG. 4 is a side view of the light source device viewed from a –X direction.

FIG. 4 is a side view of the light source device 2 viewed from the −X direction. In other words, FIG. 4 shows the state of the first color separation element 29 viewed from the −X direction. In FIG. 4, in order to make the drawing eye-friendly, there is omitted the illustration of the light source section 21, the first polarization split element 51, the first optical element 52, the first light collection element 25, the diffusion device 26, the second light collection element 27, the wavelength conversion element 28, and so on out of the constituents shown in FIG. 3.

As shown in FIG. 4, the first color separation element 29 is disposed at the +Z direction side of the second optical element 22. The first color separation element 29 has a dichroic prism 291 and a reflecting prism 292. The dichroic prism 291 and the reflecting prism 292 are arranged side by side along the Y axis. The first color separation element 29 separates light emitted toward the +Z direction from the second optical element 22 into the blue light beam BLp having the blue wavelength band and the yellow light beam YLs having the yellow wavelength band.

The blue light beam BLp having the blue wavelength band in the present embodiment corresponds to a third light beam having the first wavelength band in the appended claims. The yellow light beam YLs having the yellow wavelength band in the present embodiment corresponds to a fourth light beam having the second wavelength band in the appended claims.

The light including the blue light beam BLp and the yellow light beam YLs emitted from the second optical element 22 enters the dichroic prism 291. The dichroic prism 291 is formed of a prism type color separation element formed by combining two base members each having a substantially isosceles right triangular prismatic shape with each other to form a substantially rectangular solid shape.

On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane.

The color separation layer 2911 functions as a dichroic mirror which reflects the blue light and transmits colored light having a longer wavelength band than the blue wavelength band, namely the yellow light, out of the light which enters the color separation layer 2911. Therefore, the yellow light beam YLs out of the light having entered the dichroic prism 291 along the +Z direction from the second optical element 22 is transmitted through the color separation layer 2911 toward the +Z direction to be emitted outside the dichroic prism 291.

In contrast, the blue light beam BLp out of the light having entered the dichroic prism 291 along the +Z direction from the second optical element 22 is reflected toward the −Y direction by the color separation layer 2911. It should be noted that it is possible to adopt a dichroic mirror having the color separation layer 2911 instead of the dichroic prism 291.

The reflecting prism 292 is disposed at the −Y direction side of the dichroic prism 291. The blue light beam BLp reflected by the color separation layer 2911 enters the reflecting prism 292. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +Y direction and the +Z direction. In other words, the reflecting layer 2921 is tilted 45° with respect to the X-Y plane and the X-Z plane. In other words, the reflecting layer 2921 is disposed in parallel to the color separation layer 2911.

The blue light beam BLp which enters the reflecting layer 2921 along the −Y direction from the dichroic prism 291 is reflected toward the +Z direction by the reflecting layer 2921. The blue light beam BLp reflected by the reflecting layer 2921 is emitted from the reflecting prism 292 toward the +Z direction. It should be noted that it is possible to adopt a reflecting mirror having the reflecting layer 2921 instead of the reflecting prism 292.

Configuration of Reflecting Element

The reflecting element 31 is disposed at the +Z direction side of the dichroic prism 291. In other words, the reflecting element 31 is disposed on the light path of the yellow light beam YLs emitted from the dichroic prism 291. The reflecting element 31 is formed of a half mirror for transmitting a part of the light which enters the reflecting element 31, and reflecting the rest of the light. It is sufficient for the transmittance and the reflectance of the half mirror to arbitrarily be set in accordance with the white balance of the light L to be emitted from the light source device 2, and for example, the transmittance is set to 80%, and the reflectance is set to 20%.

Therefore, a part of the yellow light beam YLs which has entered the reflecting element 31 is transmitted through the reflecting element 31, and is then emitted toward the homogenization device 4 shown in FIG. 1. In contrast, another part of the yellow light beam YLs which has entered the reflecting element 31 is reflected by the reflecting element 31 to reenter the dichroic prism 291. The another part of the yellow light beam YLs having entered the dichroic prism 291 is transmitted through the color separation layer 2911 toward the −Z direction, and returns to the wavelength conversion element 28 via the second optical element 22, the second polarization split element 23, the first optical element 52, and the second light collection element 27.

The yellow phosphor included in the wavelength conversion element 28 hardly absorbs the yellow light having entered the wavelength conversion element 28 from the outside. Therefore, the yellow light beam YLs having returned to the wavelength conversion element 28 is repeatedly reflected or diffused to thereby turn to the yellow light beam YL as the unpolarized light without being absorbed in the wavelength conversion element 28. The yellow light beam YL as the unpolarized light is emitted once again to the outside of the wavelength conversion element 28 together with the yellow light beam YL newly generated in the yellow phosphor. The yellow light beam YL having been emitted from the wavelength conversion element 28 reenters the first optical element 52 via the second light collection element 27 as described above. As described above, the ratio between the light intensity of the yellow light beam YLs transmitted through the reflecting element 31 and the light intensity of the yellow light beam YLs reflected by the reflecting element 31 can be set in advance. Further, the reflecting element 31 can be disposed so as to have contact with a surface from which the yellow light beam YLs is emitted of the dichroic prism 291.

Configuration of Fifth Retardation Element

The fifth retardation element 30 is disposed at the +Z direction side of the reflecting prism 292. In other words, the fifth retardation element 30 is disposed on the light path of the blue light beam BLp emitted from the reflecting prism 292. The fifth retardation element 30 is formed of a ½ wave plate with respect to the blue wavelength band which the blue light beam BLp has. The fifth retardation element 30 converts the blue light beam BLp as the P-polarized light emitted from the reflecting prism 292 into the blue light beam BLs as the S-polarized light. The blue light beam BLs obtained by the conversion into the S-polarized light by the fifth retardation element 30 is emitted toward the +Z direction from the light source device 2, and then enters the homogenization device 4 shown in FIG. 1. In other words, the blue light beam BLs is spatially separated from the yellow light beam YLs, and is emitted from an exit position different from the exit position of the yellow light beam YLs in the light source device 2, and then enters the homogenization device 4. In particular, the blue light beam BLs is emitted from the exit position distant toward the −Y direction from the exit position of the yellow light beam YLs in the light source device 2, and then enters the homogenization device 4.

Configuration of Fourth Retardation Element

Figure 5:
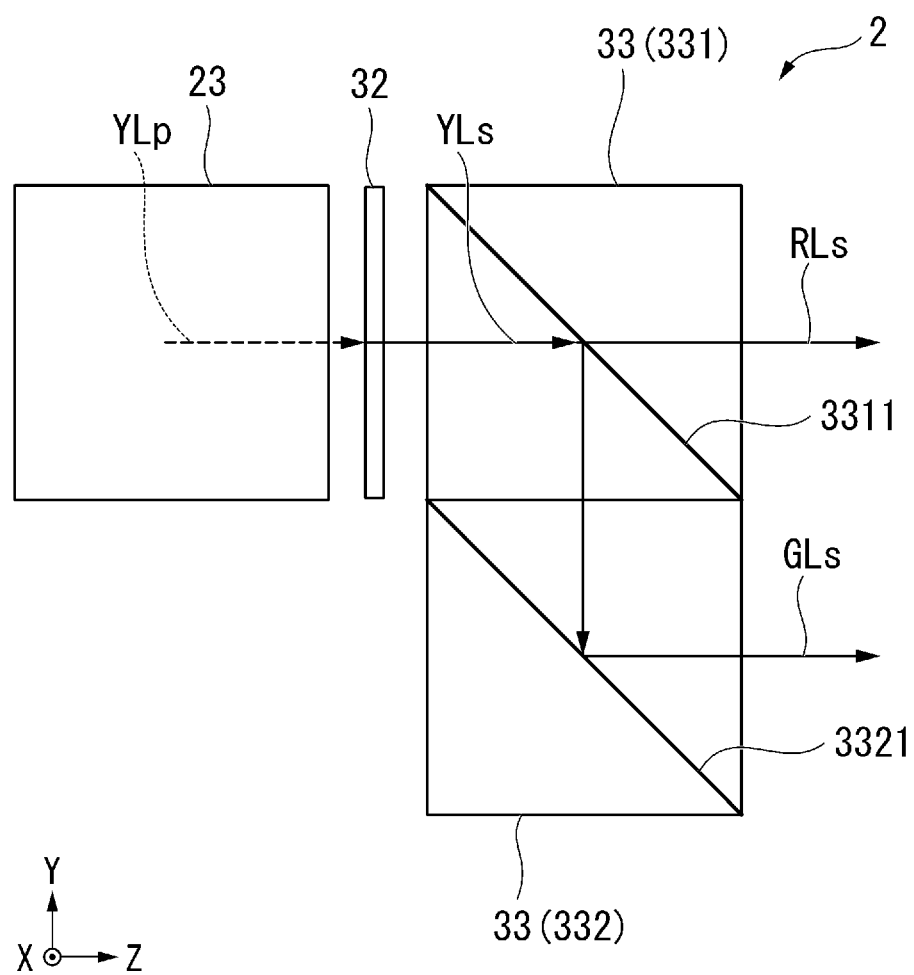
FIG. 5 is a side view of the light source device viewed from a +X direction.

FIG. 5 is a side view of the light source device 2 viewed from the +X direction. In other words, FIG. 5 shows the state of the second color separation element 33 viewed from the +X direction. In FIG. 5, in order to make the drawing eye-friendly, there is omitted the illustration of the light source section 21, the first polarization split element 51, the first optical element 52, the first light collection element 25, the diffusion device 26, the second light collection element 27, the wavelength conversion element 28, and so on out of the constituents shown in FIG. 3.

As shown in FIG. 3 and FIG. 5, the fourth retardation element 32 is disposed at the +Z direction side of the second polarization split element 23. The yellow light beam YLp having been transmitted through the second polarization split element 23 enters the fourth retardation element 32. The fourth retardation element 32 is formed of a ½ wave plate with respect to the wavelength band which the yellow light beam YLp has. The fourth retardation element 32 converts the yellow light beam YLp as the P-polarized light into the yellow light beam YLs as the S-polarized light. The yellow light beam YLs obtained by the conversion into the S-polarized light enters the second color separation element 33.

Configuration of Second Color Separation Element

As shown in FIG. 5, the second color separation element 33 is disposed at the +Z direction side of the second polarization split element 23. The second color separation element 33 has a dichroic prism 331 and a reflecting prism 332. The dichroic prism 331 and the reflecting prism 332 are arranged side by side along the Y axis. The second color separation element 33 separates the yellow light beam YLs as the S-polarized light emitted toward the +Z direction from the second polarization split element 23 via the fourth retardation element 32 into the green light beam GLs in the green wavelength band different from the wavelength band of the yellow light beam YLs and the red light beam RLs in the red wavelength band different from the wavelength band of the yellow light beam YLs and the green wavelength band.

The green light beam GLs in the green wavelength band in the present embodiment corresponds to a fifth light beam having a third wavelength band. The red light beam RLs in the red wavelength band in the present embodiment corresponds to a sixth light beam having a fourth wavelength band.

The dichroic prism 331 is formed of a prism type color separation element similarly to the dichroic prism 291. On the interface between the two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 is disposed in parallel to the reflecting layer 3321.

The color separation layer 3311 functions as a dichroic mirror which transmits the red light component and reflects the green light component out of the light entering the color separation layer 3311. Therefore, the red light beam RLs as the S-polarized light out of the yellow light beam YLs having entered the dichroic prism 331 is transmitted toward the +Z direction through the color separation layer 3311 to be emitted outside the dichroic prism 331. The red light beam RLs as the S-polarized light is emitted toward the +Z direction from the light source device 2, and then enters the homogenization device 4. In other words, the red light beam RLs is spatially separated from the yellow light beam YLs and the blue light beam BLs, and is emitted from a position different from those of the yellow light beam YLs and the blue light beam BLs, and then enters the homogenization device 4. In other words, the red light beam RLs is emitted from the exit position distant toward the +X direction from the exit position of the yellow light beam YLs in the light source device 2, and then enters the homogenization device 4.

In contrast, the green light beam GLs as the S-polarized light out of the yellow light beam YLs having entered the dichroic prism 331 is reflected toward the –Y direction by the color separation layer 3311. It should be noted that it is possible to use a dichroic mirror having the color separation layer 3311 instead of the dichroic prism 331.

The reflecting prism 332 has substantially the same configuration as the reflecting prism 292. Specifically, the reflecting prism 332 has a reflecting layer 3321 which is parallel to the color separation layer 2911, the color separation layer 3311, and the reflecting layer 2921.

The green light beam GLs which is reflected by the color separation layer 3311, and then enters the reflecting layer 3321 is reflected by the reflecting layer 3321 toward the +Z direction. The green light beam GLs having been reflected by the reflecting layer 3321 is emitted outside the reflecting prism 332. The green light beam GLs is emitted toward the +Z direction from the light source device 2, and then enters the homogenization device 4. Specifically, the green light beam GLs is spatially separated from the yellow light beam YLs, the blue light beam BLs, and the red light beam RLs, and is emitted from a position different from those of the yellow light beam YLs, the blue light beam BLs, and the red light beam RLs, and then enters the homogenization device 4. In other words, the green light beam GLs is emitted from the exit position which is distant toward the –Y direction from the exit position of the red light beam RLs in the light source device 2, and is distant toward the +X direction from the exit position of the blue light beam BLs, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 6:
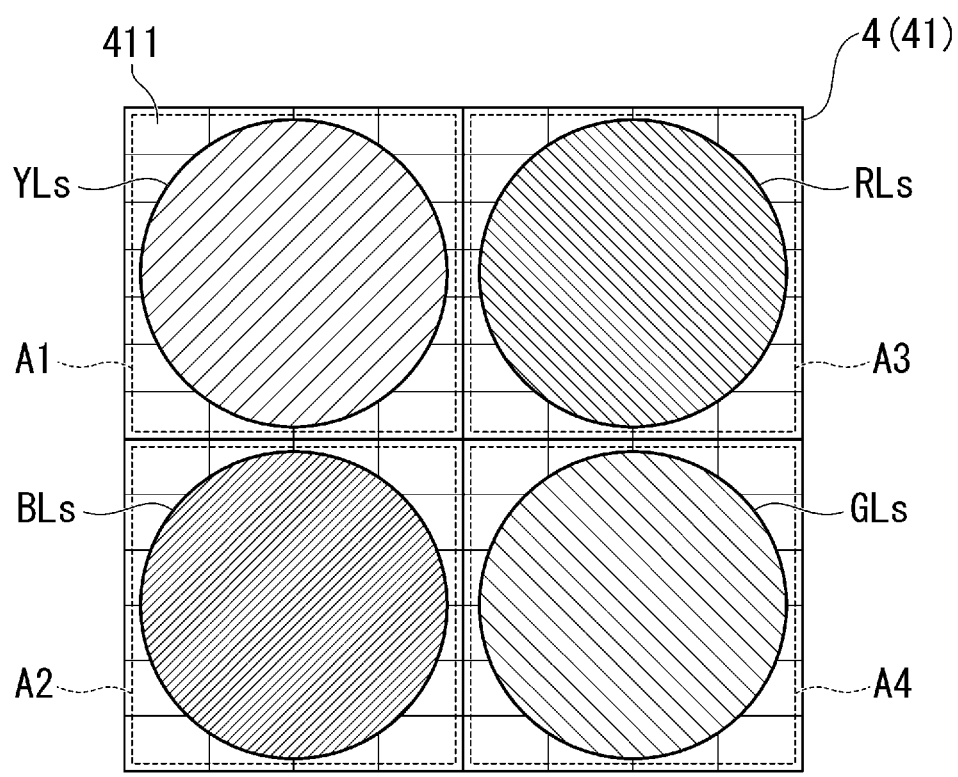
FIG. 6 is a schematic diagram showing positions of incidence of colored light beams on a multi-lens.
Figure 6:
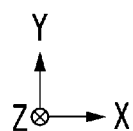

FIG. 6 is a schematic diagram showing positions of incidence of the respective colored light beams in the first multi-lens 41 viewed from the –Z direction.

As shown in FIG. 6, the yellow light beam YLs, the blue light beam BLs, the red light beam RLs, and the green light beam GLs emitted from the light source device 2 enter the first multi-lens 41. The yellow light beam YLs emitted from the position at the –X direction side and at the +Y direction side in the light source device 2 enters a plurality of lenses 411 included in an area A1 located at the –X direction side and at the +Y direction side in the first multi-lens 41. Further, the blue light beam BLs emitted from the position at the –X direction side and at the –Y direction side in the light source device 2 enters a plurality of lenses 411 included in an area A2 located at the –X direction side and at the –Y direction side in the first multi-lens 41.

The red light beam RLs emitted from the position at the +X direction side and at the +Y direction side in the light source device 2 enters a plurality of lenses 411 included in an area A3 located at the +X direction side and at the +Y direction side in the first multi-lens 41. Further, the green light beam GLs emitted from the position at the +X direction side and at the –Y direction side in the light source device 2 enters a plurality of lenses 411 included in an area A4 located at the +X direction side and at the –Y direction side in the first multi-lens 41. Each of the colored light beams having entered the lenses 411 is converted into a plurality of partial light beams, and enters lenses 421 corresponding respectively to the lenses 411 in the second multi-lens 42.

The blue light beam BLs out of the light beam L emitted from the light source device 2 according to the present embodiment corresponds to the third light beam in the appended claims. The yellow light beam YLs corresponds to the fourth light beam in the appended claims. The green light beam GLs corresponds to the fifth light beam in the appended claims. The red light beam RLs corresponds to the sixth light beam in the appended claims.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The partial light beams emitted from the lenses 411 opposed respectively to the lenses 421 enter the respective lenses 421. Each of the lenses 421 makes the partial light beam enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the yellow light beam YLs, the blue light beam BLs, the red light beam RLs, and the green light beam GLs each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and a single microlens array 62.

Configuration of Liquid Crystal Panel

Figure 7:
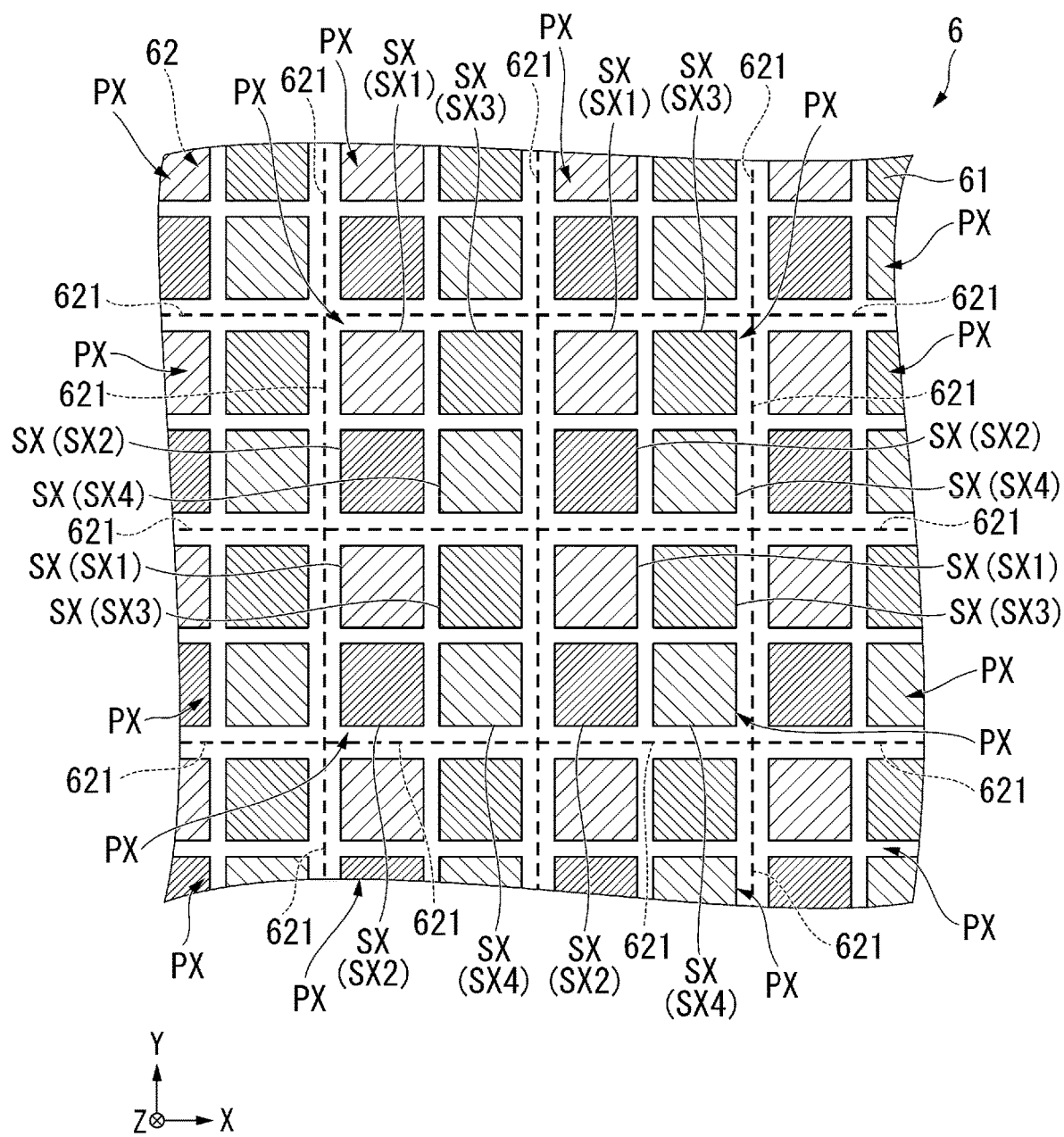
FIG. 7 is an enlarged view of a light modulation device.

FIG. 7 is a schematic enlarged view of a part of the light modulation device 6 viewed from the −Z direction. In other words, FIG. 7 shows a correspondence relationship between the pixels PX provided to the liquid crystal panel 61 and the microlenses 621 provided to the microlens array 62.

As shown in FIG. 7, the liquid crystal panel 61 has the plurality of pixels PX arranged in a matrix in a plane perpendicular to the illumination light axis Ax (the Z axis).

One pixel PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position at the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the plurality of colored light beams entering the microlens array 62 to the individual pixels PX. The microlens array 62 has the plurality of microlenses 621 corresponding to the plurality of pixels PX.

As shown in FIG. 7, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2×2 in the X-Y plane.

The yellow light beam YLs, the blue light beam BLs, the red light beam RLs, and the green light beam GLs superimposed by the homogenization device 4 enter the microlenses 621 at respective angles different from each other. The microlenses 621 make the colored light beams entering the microlens 621 enter the sub-pixels SX corresponding to the colored light beams. Specifically, out of the sub-pixels SX of the pixel PX corresponding to the microlens 621, the microlens 621 makes the yellow light beam YLs enter the first sub-pixel SX1, makes the blue light beam BLs enter the second sub-pixel SX2, makes the red light beam RLs enter the third sub-pixel SX3, and makes the green light beam GLs enter the fourth sub-pixel SX4. Thus, the colored light beams corresponding respectively to the sub-pixels SX1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface such as a screen not shown.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to manufacture the PBS array narrow in pitch.

To cope with this problem, the light source device 2 according to the present embodiment is provided with the light source section 21 which emits the blue light beams BLp, BLs having the blue wavelength band and respectively including the P-polarized light and the S-polarized light, the first polarization split element 51 which transmits the blue light beam BLp entering the first polarization split element 51 along the +X direction from the light source section 21 toward the +X direction, and reflects the blue light beam BLs toward the −Z direction crossing the +X direction, the first optical element 52 which is disposed at the +X direction side of the first polarization split element 51, and reflects the blue light beam BLs entering the first optical element 52 along the +X direction from the first polarization split element 51 toward the −Z direction, the diffusion plate 261 which is disposed at the −Z direction side of the first polarization split element 51, diffuses the blue light beam BLc1 entering the diffusion plate 261 along the −Z direction from the first polarization split element 51, and emits the blue light beam BLc2 thus diffused toward the +Z direction as the opposite direction to the −Z direction, the wavelength conversion element 28 which is disposed at the −Z direction side of the first optical element 52, and performs the wavelength conversion on the blue light beam BLs entering the wavelength conversion element 28 along the −Z direction from the first optical element 52 to emit the yellow light beam YL having the wavelength band including the green wavelength band and the red wavelength band different from the blue wavelength band toward the +Z direction, the second polarization split element 23 which is disposed at the +Z direction side of the first optical element 52, which the yellow light beam YL enters along the +Z direction from the first optical element 52, and which transmits the yellow light beam YLp as the P-polarized light toward the +Z direction, and reflects the yellow light beam YLs as the S-polarized light toward the −X direction as the opposite direction to the +X direction, and the second optical element 22 which is disposed at the −X direction side of the second polarization split element 23, and reflects the yellow light beam YLs as the S-polarized light entering the second optical element 22 along the −X direction from the second polarization split element 23 toward the +Z direction, wherein the blue light beam BLp which enters the first polarization split element 51 along the +Z direction from the diffusion plate 261 is transmitted by the first polarization split element 51 toward the +Z direction, the yellow light beam YL which enters the first optical element 52 along the +Z direction from the wavelength conversion element 28 is transmitted by the first optical element 52 toward the +Z direction, and the blue light beam BLp which enters the second optical element 22 along the +Z direction from the first polarization split element 51 is transmitted by the second optical element 22 toward the +Z direction.

In the present embodiment, the four colors of colored light beams uniform in the polarization direction, namely the blue light beam BLs as the S-polarized light, the yellow light beam YLs as the S-polarized light, the green light beam GLs as the S-polarized light, and the red light beam RLs as the S-polarized light, are emitted from the light source device 2. According to this configuration, it is possible to realize the light source device 2 capable of emitting the plurality of colored light beams spatially separated from each other and uniformed in the polarization direction without using the polarization conversion element narrow in pitch described above. Thus, it is possible to reduce the light source device 2 in size, and by extension, it is possible to achieve reduction in size of the projector 1.

Further, in the projector 1 according to the present embodiment, since the yellow light beam YLs enters the light modulation device 6 in addition to the blue light beam BLs, the green light beam GLs, and the red light beam RLs, it is possible to increase the luminance of the image projected from the projection optical device 7.

When considering the light source device with which substantially the same advantages as described above can be obtained, it is conceivable to adopt a configuration in which, for example, two polarization split elements consisting of the first polarization split element and the second polarization split element are arranged in sequence in the +X direction, the diffusion element is disposed at the −Z direction side of the first polarization split element, the wavelength conversion element is disposed at the −Z direction side of the second polarization split element, and the four colored light beams obtained from the diffusion element and the wavelength conversion element are emitted toward the +Z direction on the condition that substantially the same light source section as in the present embodiment is used. This light source device will hereinafter be referred to as a light source device according to a comparative example.

In the light source device according to the comparative example, it is necessary to make the blue light beam BLs as the S-polarized light reflected toward the −Z direction by the first polarization split element enter the diffusion element, and to make the second polarization split element reflect the blue light beam BLp as the P-polarized light transmitted toward the +X direction through the first polarization split element toward the −Z direction to enter the wavelength conversion element. In other words, it is necessary to transmit the blue light beam BLp as the P-polarized light in the first polarization split element on the one hand, but it is necessary to reflect the blue light beam BLp as the P-polarized light in the second polarization split element.

However, it is common for the polarization split film used in the polarization split element to have a characteristic of reflecting the S-polarized light and transmitting the P-polarized light. Therefore, when realizing the light source device according to the comparative example, it is difficult to manufacture the second polarization split element for reflecting the blue light as the P-polarized light. Specifically, in order to realize the characteristic described above, it is necessary to make the number of layers in the dielectric multilayer film which forms the polarization split film of the second polarization split element extremely large, and it is difficult to form the dielectric multilayer film. Further, since the dielectric multilayer film extremely large in the number of layers is high in absorption of light, there is a problem that a loss of light occurs. Further, since it is necessary for the polarization split film of the second polarization split element to have a polarization split characteristic of reflecting the yellow light as the S-polarized light and transmitting the yellow light as the P-polarized light with respect to the yellow light, it is more difficult to manufacture the polarization split film of reflecting the P-polarized light with respect to the blue light while keeping the polarization split characteristic with respect to the yellow light.

To cope with this problem, in the light source device 2 according to the present embodiment, only the blue light beams BLp, BLs enter the first polarization split element 51, and it is sufficient for the first polarization split element 51 to have the polarization split characteristic of transmitting the P-polarized light and reflecting the S-polarized light with respect to the blue light beams BLp, BLs. It is sufficient for the first optical element 52 to have a characteristic of reflecting the blue light beam BLs as the S-polarized light and transmitting the yellow light beam YL. Only the yellow light beam YL enter the second polarization split element 23, and it is sufficient for the second polarization split element to have the polarization split characteristic of transmitting the P-polarized light and reflecting the S-polarized light with respect to the yellow light. It is sufficient for the second optical element 22 to have a characteristic of transmitting the blue light beam BLp as the P-polarized light and reflecting the yellow light beam YLs as the S-polarized light.

As described above, in the light source device 2 according to the present embodiment, the dielectric multilayer film for forming each of the first polarization split element 51, the first optical element 52, the second polarization split element 23, and the second optical element 22 is not required to have a special polarization split characteristic such as a characteristic of reflecting the P-polarized light and transmitting the S-polarized light. Therefore, it is easy to form the dielectric multilayer film. Specifically, since it is possible to reduce the number of layers of the dielectric multilayer film, it is possible to achieve reduction of the manufacturing cost and an improvement of the yield ratio. Further, it is possible to manufacture the first polarization split element 51, the first optical element 52, the second polarization split element 23, and the second optical element all excellent in light separation characteristic. As described above, according to the light source device 2 related to the present embodiment, it is possible to solve the problem described above which the light source device according to the comparative example has.

Further, the light source device 2 according to the present embodiment is further provided with the first retardation element 24 which is disposed between the first polarization split element 51 and the diffusion plate 261, and which the blue light beam BLs as the S-polarized light enters along the −Z direction from the first polarization split element 51.

According to this configuration, it is possible to convert the blue light beam BLc2 as the circularly polarized light having been emitted from the diffusion plate 261 with the first retardation element 24 into the blue light beam BLp as the P-polarized light, and make the result be transmitted through the first polarization split element 51 to enter the second optical element 22. Thus, it is possible to increase the use efficiency of the blue light beam BLc2 emitted from the diffusion plate 261.

Further, in the light source device 2 according to the present embodiment, the light source section 21 has the light emitting elements 211 for emitting the blue light beams BLs having the blue wavelength band, and the second retardation element 2131 which the blue light beams BLs emitted from the light emitting elements 211 enter, and which emits the blue light including the blue light beam BLs as the S-polarized light and the blue light beam BLp as the P-polarized light.

According to this configuration, it is possible to surely make the blue light beam BLp as the P-polarized light and the blue light beam BLs as the S-polarized light enter the first polarization split element 51. Further, according to this configuration, since the polarization directions of the light beams emitted from the plurality of light emitting elements 211 are allowed to be the same, it is sufficient to dispose the same solid-state light sources in the same orientation, and thus, it is possible to simplify the configuration of the light source section 21.

Further, in the light source device 2 according to the present embodiment, there is adopted the configuration in which the second retardation element 2131 can rotate centering on the rotational axis extending along the proceeding direction of the blue light beam BLs entering the second retardation element 2131.

According to this configuration, by adjusting the rotational angle of the second retardation element 2131, it is possible to adjust the ratio between the light intensity of the blue light beam BLs which enters the first polarization split element 51 and the light intensity of the blue light beam BLp which enters the first polarization split element 51. Thus, it is possible to adjust the light intensity ratio between the blue light beam BLs, and the yellow light beam YLs, the green light beam GLs, and the red light beam RLs emitted from the light source device 2, and therefore, it is possible to adjust the white balance of the light source device 2.

Further, in the light source device 2 according to the present embodiment, there is disposed the fourth retardation element 32 between the second polarization split element 23 and the second color separation element 33.

According to this configuration, it is possible to convert the yellow light beam YLp as the P-polarized light emitted from the second polarization split element 23 into the yellow light beam YLs as the S-polarized light with the fourth retardation element 32. Thus, it is possible to convert the green light beam GLs and the red light beam RLs emitted from the second color separation element 33 into the light as the S-polarized light, and it is possible to uniform all of the blue light beam BLs, the yellow light beam YLs, the green light beam GLs, and the red light beam RLs emitted from the light source device 2 into the light as the S-polarization component.

Further, in the light source device 2 according to the present embodiment, there is disposed the fifth retardation element 30 formed of the ½ wave plate with respect to the blue wavelength band at the +Z direction side of the reflecting prism 292.

According to this configuration, it is possible to convert the blue light beam BLp as the P-polarized light emitted from the reflecting prism 292 into the blue light beam BLs as the S-polarized light with the fifth retardation element 30. Thus, it is possible to uniform all of the blue light beam BLs, the yellow light beam YLs, the green light beam GLs, and the red light beam RLs emitted from the light source device 2 into the S-polarized light.

Further, in the light source device 2 according to the present embodiment, the reflecting element 31 for reflecting a part of the yellow light beam YLs is disposed at the light exit side of the yellow light beam YLs in the first color separation element 29.

According to this configuration, by using the reflecting elements 31 different in reflectance from each other, it is possible to adjust the ratio in light intensity between the yellow light beam YLs, and the green light beam GLs and the red light beam RLs emitted from the light source device 2. Thus, it is possible to adjust the white balance of the light source device 2. Further, by increasing the ratio of the light intensity of the yellow light beam YLs to the light intensity of other colored light beams, it is possible to increase the luminance of the projection image. Further, by increasing the ratio of the light intensity of the green light beam GLs and the red light beam RLs to the light intensity of other colored light beams, it is possible to increase the color reproducibility of the projection image.

Further, the light source device 2 according to the present embodiment is provided with the first light collection element 25 for collecting the blue light beam BLc1 toward the diffusion plate 261.

According to this configuration, it is possible to efficiently converge the blue light beam BLc1 emitted from the first retardation element 24 on the diffusion plate 261 with the first light collection element 25, and at the same time, it is possible to collimate the blue light beam BLc2 emitted from the diffusion plate 261. Thus, it is possible to suppress the loss of the blue light beam BLs, and therefore, it is possible to increase the use efficiency of the blue light beam BLs.

Further, the light source device 2 according to the present embodiment is provided with the second light collection element 27 for collecting the blue light beam BLs toward the wavelength conversion element 28.

According to this configuration, it is possible to efficiently converge the blue light beam BLs emitted from the first optical element 52 on the wavelength conversion element 28 with the second light collection element 27, and at the same time, it is possible to collimate the yellow light beam YL emitted from the wavelength conversion element 28. Thus, it is possible to suppress the loss of the blue light beam BLp and the yellow light beam YL, and therefore, it is possible to increase the use efficiency of the blue light beam BLp and the yellow light beam YL.

The projector 1 according to the present embodiment is provided with the light source device 2 according to the present embodiment, the light modulation device 6 for modulating the light emitted from the light source device 2 in accordance with the image information, and the projection optical device 7 for projecting the light modulated by the light modulation device 6.

According to this configuration, it is possible to realize the projector 1 of a single plate type small in size and excellent in light use efficiency.

Further, the projector 1 according to the present embodiment is provided with the homogenization device 4 located between the light source device 2 and the light modulation device 6.

According to this configuration, it is possible to substantially uniformly illuminate the light modulation device 6 with the blue light beam BLs, the yellow light beam YLs, the green light beam GLs, and the red light beam RLs emitted from the light source device 2. Thus, it is possible to suppress the color unevenness and the luminance unevenness in the projection image.

Further, in the projector 1 according to the present embodiment, the light modulation device 6 is provided with the microlens array 62 having the plurality of microlenses 621 corresponding to the plurality of pixels PX.

According to this configuration, it is possible to make the four colored light beams entering the light modulation device 6 enter the corresponding four sub-pixels SX in the liquid crystal panel 61 with the microlens 621. Thus, it is possible to make the colored light beams emitted from the light source device 2 efficiently enter the respective sub-pixels SX, and thus, it is possible to increase the use efficiency of the colored light beams.

Second Embodiment

A second embodiment of the present disclosure will hereinafter be described using FIG. 8 and FIG. 9.

A light source device according to the second embodiment is substantially the same in basic configuration as that of the first embodiment, but is different in configuration of the reflecting element from that of the first embodiment. Therefore, the overall description of the light source device will be omitted.

Figure 8:
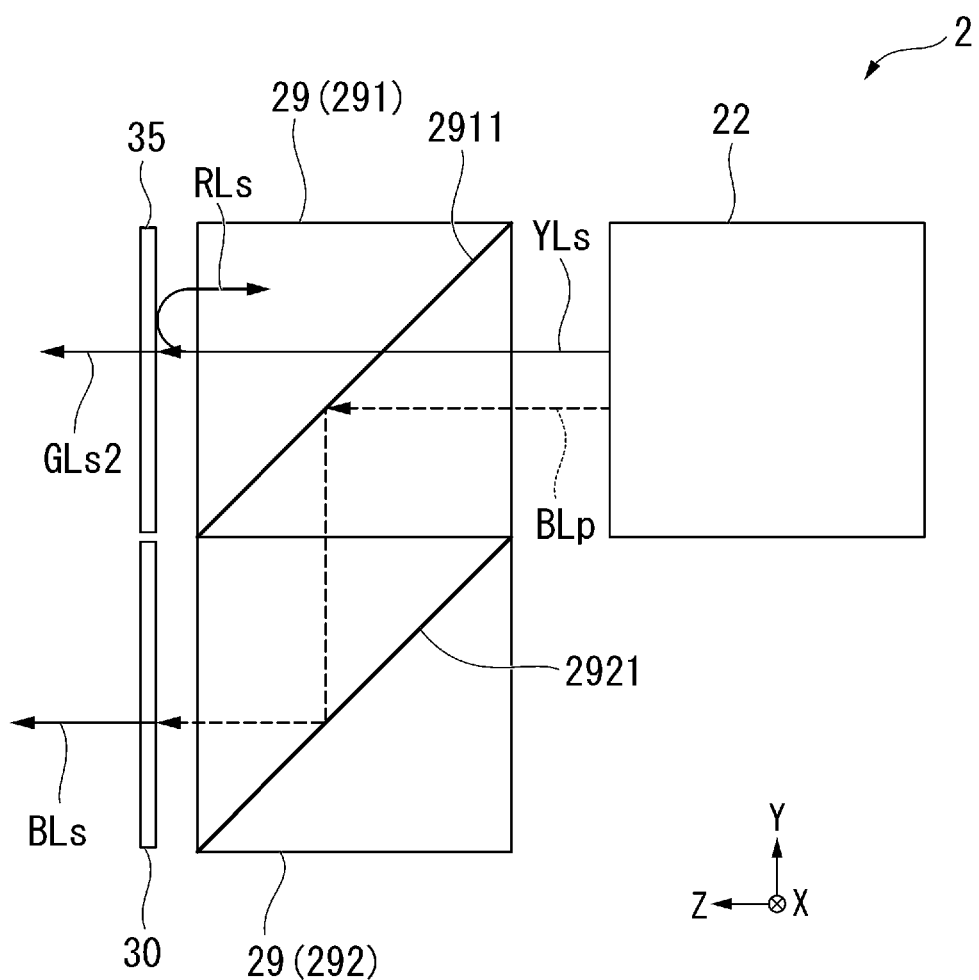
FIG. 8 is a side view of a light source device according to a second embodiment viewed from the –X direction.

FIG. 8 is a side view of a light source device 12 according to the second embodiment viewed from the −X direction. FIG. 9 is a schematic diagram showing positions of incidence of colored light beams on a multi-lens. It should be noted that in FIG. 8, in order to make the drawing eye-friendly, there is omitted the illustration of the light source section 21, the first polarization split element 51, the first optical element 52, the first light collection element 25, the diffusion device 26, the second light collection element 27, the wavelength conversion element 28, and so on out of the constituents shown in FIG. 3.

Figure 9:
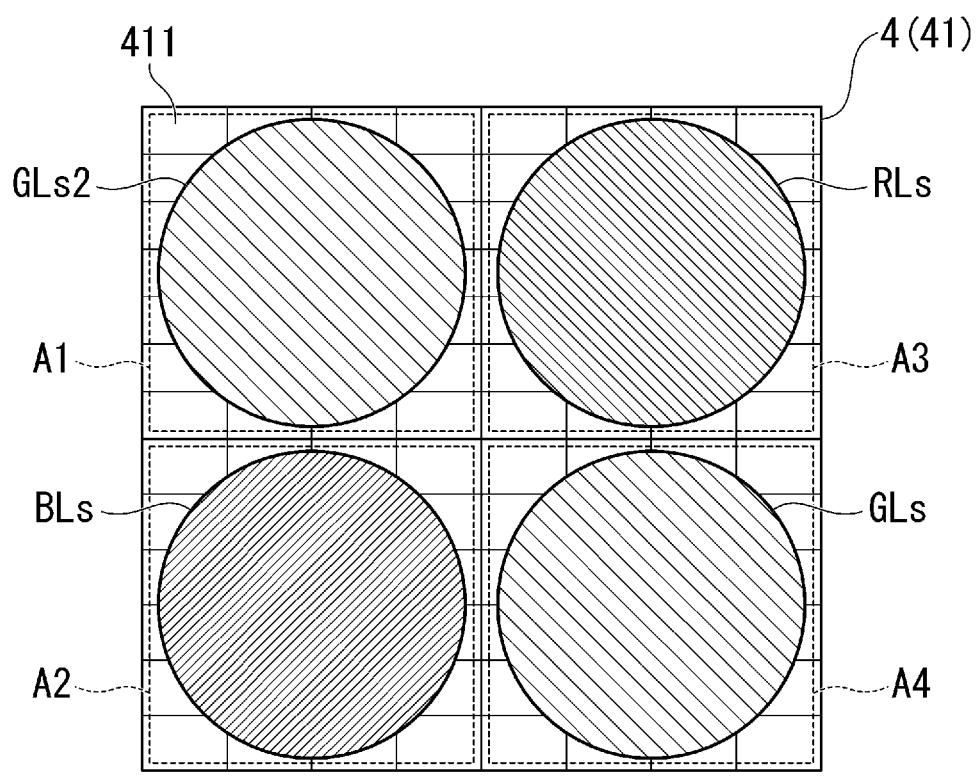
FIG. 9 is a schematic diagram showing positions of incidence of colored light beams on a multi-lens.
Figure 9:
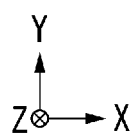

In FIG. 8 and FIG. 9, the constituents common to the drawings used in the first embodiment are denoted by the same reference symbols, and the description thereof will be omitted.

As shown in FIG. 8, the light source device 12 according to the present embodiment is provided with a third color separation element 35 instead of the reflecting element in the light source device 2 according to the first embodiment. Specifically, the third color separation element 35 is disposed at the +Z direction side of the dichroic prism 291 on the light path of the yellow light beam YLs separated by the first color separation element 29. The third color separation element 35 is formed of a dichroic mirror having a characteristic of transmitting a green light beam GLs2 and reflecting the red light beam RLs. It should be noted that it is also possible to use a dichroic prism as the third color separation element 35 instead of the dichroic mirror.

Therefore, the green light beam GLs2 included in the yellow light beam YLs which enters the third color separation element 35 from the dichroic prism 291 of the first color separation element 29 is transmitted through the third color separation element 35 to be transmitted outside the light source device 12. In other words, the light source device 12 emits the green light beam GLs2 instead of the yellow light beam YLs from the position where the yellow light beam YLs is emitted in the light source device 2 according to the first embodiment.

In the present embodiment, the green light beam GLs2 emitted from the position where the yellow light beam YLs is emitted in the first embodiment corresponds to the fourth light beam in the appended claims.

In contrast, the red light beam RLs included in the yellow light beam YLs which enters the third color separation element 35 is reflected by the third color separation element 35 to enter the dichroic prism 291 from the −Z direction. Similarly to the yellow light beam YLs reflected by the reflecting element 31 in the light source device 2 according to the first embodiment, the red light beam RLs returns to the wavelength conversion element 28 via the second optical element 22, the second polarization split element 23, the first optical element 52, and the second light collection element 27.

As described above, since the yellow phosphor included in the wavelength conversion element 28 hardly absorbs the yellow light having entered the wavelength conversion element 28 from the outside, the yellow phosphor hardly absorbs the red light. Therefore, the red light beam RLs having entered the wavelength conversion element 28 is repeatedly reflected inside the wavelength conversion element 28 to thereby turn to a red light beam as unpolarized light, and is then emitted outside the wavelength conversion element 28 together with the yellow light beam YL generated by the yellow phosphor. The red light beam RLs as the S-polarized light out of the red light beam emitted from the wavelength conversion element 28 is transmitted through the first optical element 52, then reflected by the second polarization split element 23, and then enters the first color separation element 29 once again to repeat the behavior described above. In contrast, the red light beam RLp as the P-polarized light out of the red light beam emitted from the wavelength conversion element 28 is transmitted in sequence through the first optical element 52 and the second polarization split element 23, and is then emitted outside the light source device 12 via the fourth retardation element 32 and the second color separation element 33.

As shown in FIG. 9, the light source device 12 emits the green light beam GLs2, the blue light beam BLs, the red light beam RLs, and the green light beam GLs. The green light beam GLs2 is emitted from the position at the −X direction side and at the +Y direction side in the light source device 2, and then enters a plurality of lenses 411 disposed in the area A1 located at the −X direction side and at the +Y direction side in the first multi-lens 41. Although not shown in the drawings, the green light beam GLs2 enters the microlenses 621 via the first multi-lens 41, the second multi-lens 42, the superimposing lens 43, and the field lens 5 similarly to the yellow light beam YLs in the first embodiment. The green light beam GLs2 having entered each of the microlenses 621 enters the first sub-pixel SX1 of the pixel PX corresponding to that microlens 621.

Advantages of Second Embodiment

Also in the present embodiment, it is possible to obtain substantially the same advantages as in the first embodiment such as the advantage that it is possible to realize the light source device 12 capable of emitting the plurality of colored light beams made uniform in polarization direction without using the polarization conversion element narrow in pitch, the advantage that it is possible to achieve the reduction in size of the light source device 12 and the projector 1, and the advantage that it is easy to form the dielectric multilayer film, and it is possible to manufacture the optical element and the polarization split element which are low in cost, and excellent in light separation characteristic.

Further, in the light source device 12 according to the second embodiment, since the green light beam GLs2 is emitted instead of the yellow light beam YLs in the light source device 2 according to the first embodiment, it is possible to increase the light intensity of the whole of the green light which enters the pixel PX. Thus, it is possible to increase the luminosity factor of the projection image.

It should be noted that it is possible to use a dichroic mirror having a characteristic of reflecting the green light beam GLs and transmitting the red light beam RLs as the third color separation element 35 in contrast to the present embodiment. Depending on the yellow phosphor included in the wavelength conversion element 28, the red light beam included in the yellow light beam YL emitted from the wavelength conversion element 28 becomes insufficient in some cases. In this case, by using a dichroic mirror having the characteristic described above, it is possible to make the red light beam enter the first sub-pixel SX1 and the third sub-pixel SX3 out of the four sub-pixels SX1 through SX4. Thus, it is possible to increase the color reproducibility of the projection image.

Third Embodiment

A third embodiment of the present disclosure will hereinafter be described using FIG. 10 through FIG. 13.

A light source device according to the third embodiment is substantially the same in basic configuration as that of the first embodiment, but is different in arrangement and configuration of a variety of elements from that of the first embodiment. Therefore, the overall description of the light source device will be omitted.

Figure 10:
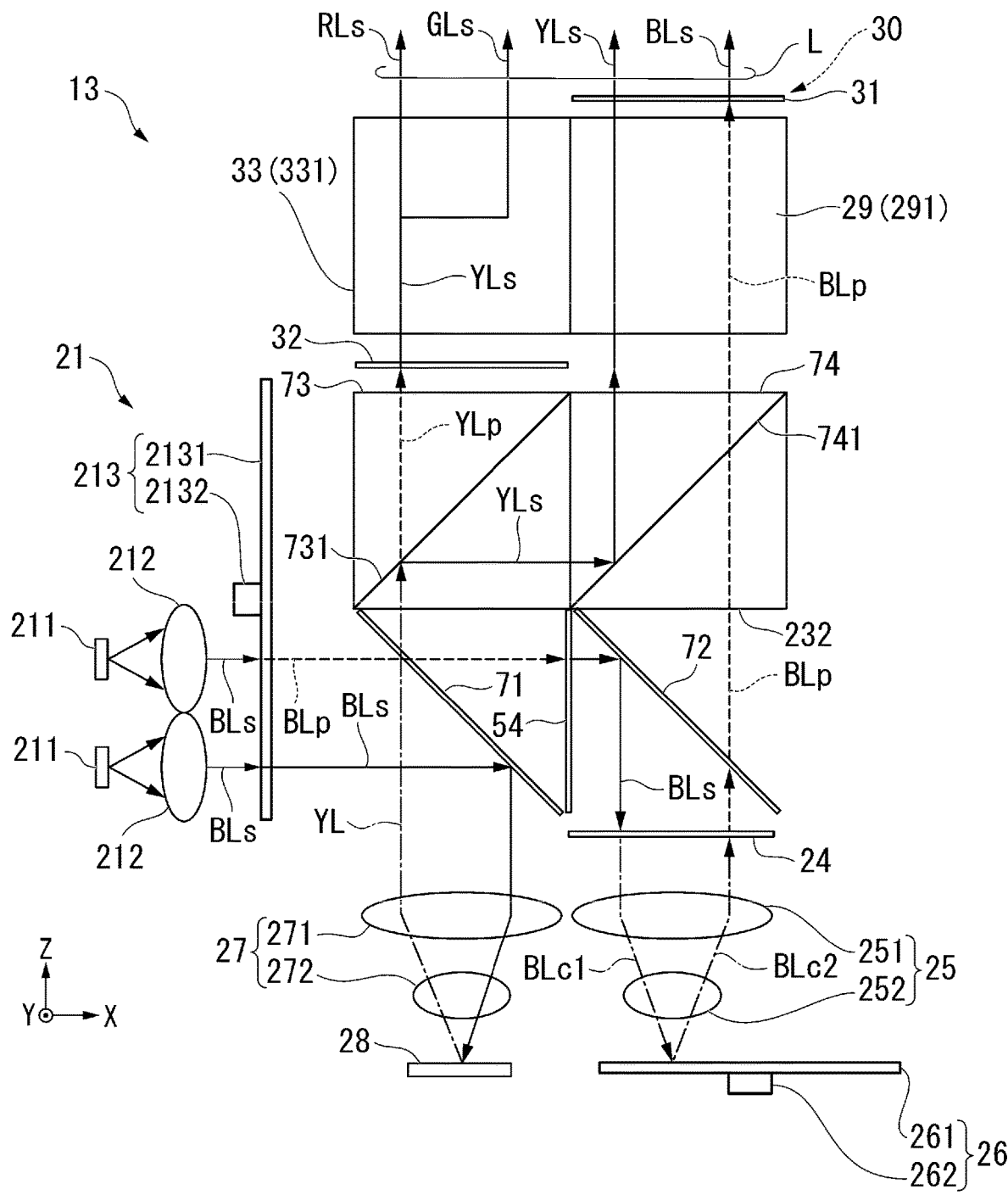
FIG. 10 is a plan view of a light source device according to a third embodiment viewed from the +Y direction.
Figure 11:
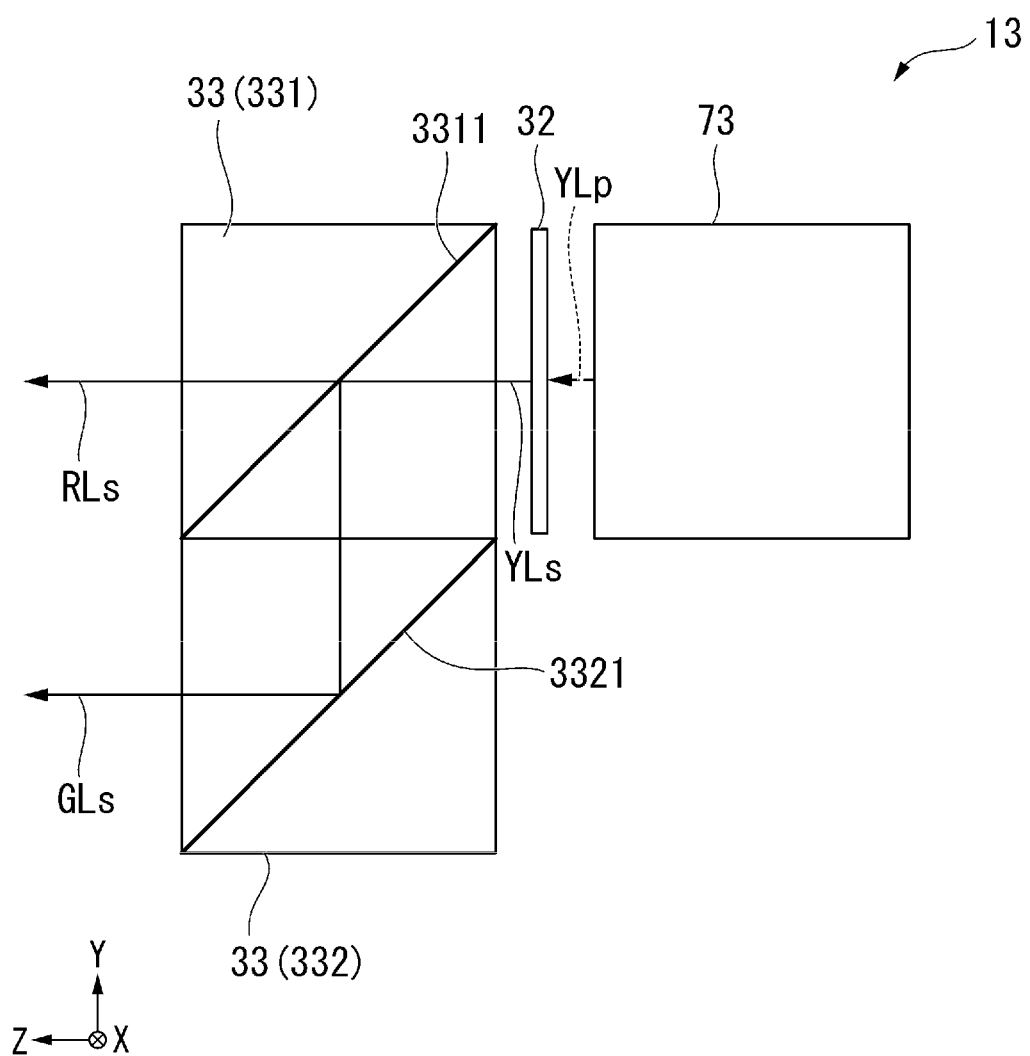
FIG. 11 is a side view of the light source device viewed from the –X direction.
Figure 12:
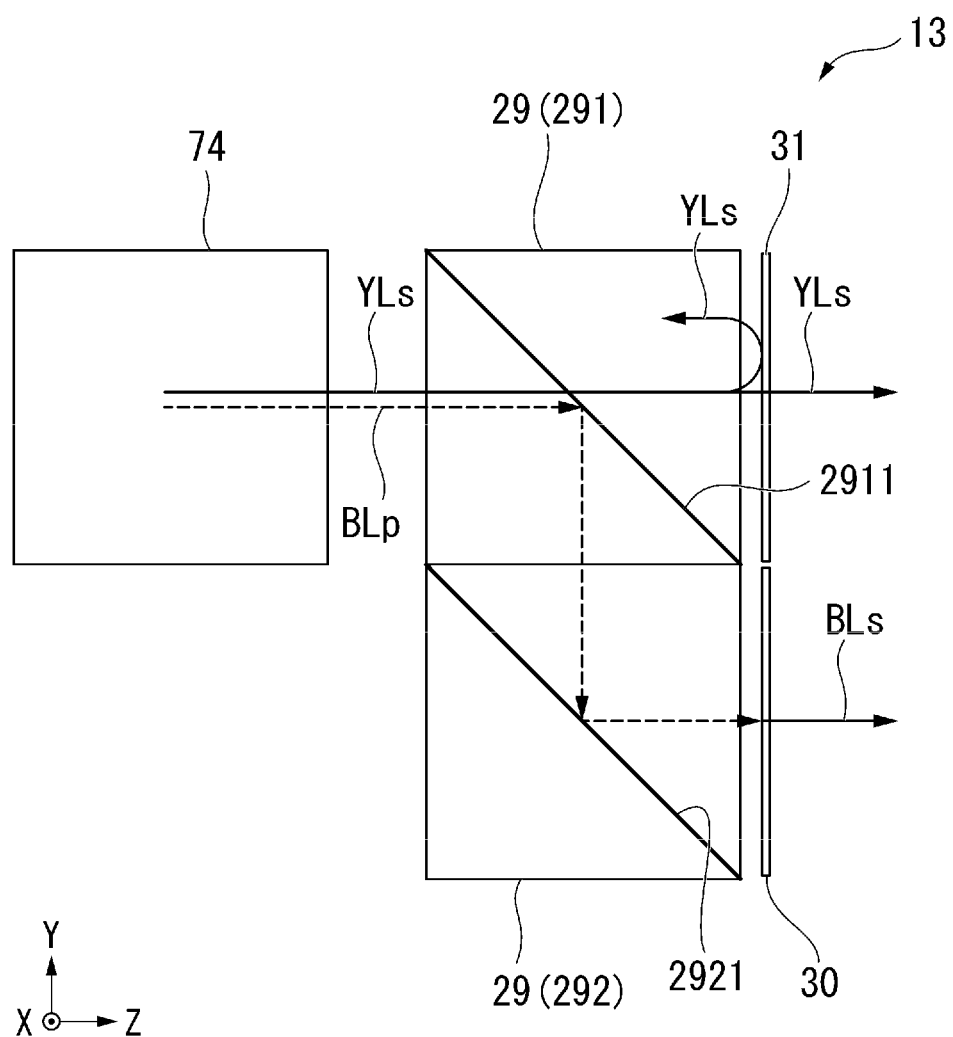
FIG. 12 is a side view of the light source device viewed from the +X direction.
Figure 13:
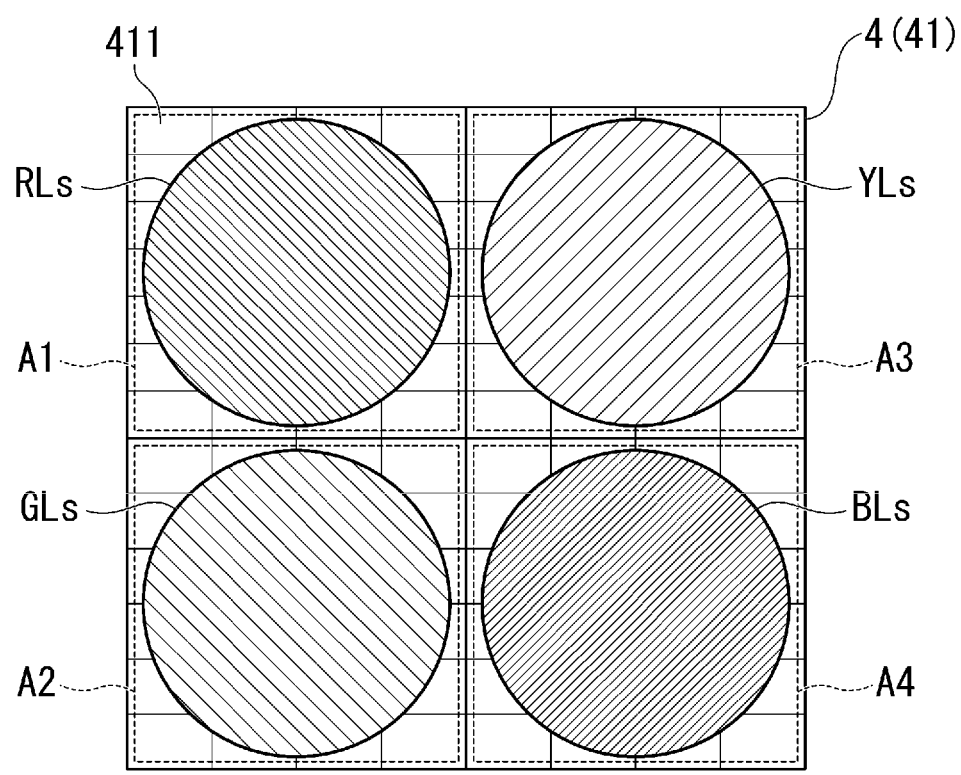
FIG. 13 is a schematic diagram showing positions of incidence of colored light beams on a multi-lens.
Figure 13:
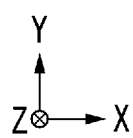

FIG. 10 is a plan view of a light source device 13 according to the third embodiment viewed from the +Y direction. FIG. 11 is a side view of the light source device 13 viewed from the −X direction. FIG. 12 is a side view of the light source device 13 viewed from the +X direction. FIG. 13 is a schematic diagram showing positions of incidence of colored light beams on a multi-lens.

In FIG. 10 through FIG. 13, the constituents common to the drawings used in the first embodiment are denoted by the same reference symbols, and the description thereof will be omitted.

As shown in FIG. 10, the light source device 13 according to the present embodiment is provided with the light source section 21, a first polarization split element 71, a first optical element 72, a second polarization split element 73, a second optical element 74, the first retardation element 24, the first light collection element 25, the diffusion device 26, the second light collection element 27, the wavelength conversion element 28, the first color separation element 29, the fourth retardation element 32, the second color separation element 33, the reflecting element 31, and the fifth retardation element 30.

In the light source device 13 according to the present embodiment, the positions of the diffusion device 26 and the wavelength conversion element 28 with respect to the first polarization split element 71 and the first optical element 72 are reversed from the positions of the diffusion device 26 and the wavelength conversion element 28 with respect to the first polarization split element 51 and the first optical element 52 in the first embodiment. In other words, in the light source device 13 according to the present embodiment, the wavelength conversion element 28 is disposed at the −Z direction side of the first polarization split element 71. Further, the diffusion device 26 is disposed at the −Z direction side of the first optical element 72.

Further, in the light source device 13 according to the present embodiment, the positions of the second polarization split element 73 and the second optical element 74 are reversed from the positions of the second polarization split element 23 and the second optical element 22 in the first embodiment. Specifically, in the light source device 13 according to the present embodiment, the second polarization split element 73 is disposed at the −X direction side of the second optical element 74. Further, in the light source device 13 according to the present embodiment, the positions of the first color separation element 29 and the second color separation element 33 are reversed from the positions of the first color separation element 29 and the second color separation element 33 in the first embodiment. Specifically, in the light source device 13 according to the present embodiment, the first color separation element 29 is disposed at the +X direction side of the second color separation element 33.

Configuration of First Polarization Split Element

The first polarization split element 71 transmits the blue light beam BLp as the P-polarized light which enters the first polarization split element 71 along the +X direction from the light source section 21 toward the +X direction, and reflects the blue light beam BLs as the S-polarized light which enters the first polarization split element 71 along the +X direction toward the −Z direction. Further, the yellow light beam YL which enters the first polarization split element 71 along the +Z direction from the wavelength conversion element 28 is transmitted by the first polarization split element 71 toward the +Z direction. Therefore, in the case of the present embodiment, the first polarization split element 71 has a polarization split characteristic of transmitting the P-polarized light and reflecting the S-polarized light with respect to the light in the blue wavelength band, and a characteristic of transmitting the light in the wavelength band including the green wavelength band and the red wavelength band irrespective of the polarization direction.

Configuration of First Optical Element

The first optical element 72 is disposed at the +X direction side of the first polarization split element 71. The blue light beam BLs which enters the first optical element 72 along the +X direction from the first polarization split element 71 via the third retardation element 54 is reflected by the first optical element 72 toward the −Z direction. Further, the blue light beam BLp which enters the first optical element 72 along the +Z direction from the diffusion plate 261 is transmitted by the first optical element 72 toward the +Z direction. Therefore, in the case of the present embodiment, the first optical element 72 has a polarization split characteristic of transmitting the P-polarized light and reflecting the S-polarized light with respect to the light in the blue wavelength band. Since the yellow light beam YL does not enter the first optical element 72, the characteristic of the first optical element 72 with respect to the light in the wavelength band including the green wavelength band and the red wavelength band is not particularly limited.

It should be noted that it is described in the first embodiment that the third retardation element 54 can be disposed and is not required to be disposed, but in the present embodiment, the third retardation element 54 is required to be disposed. The reason is that the blue light beam BLp having been transmitted through the first polarization split element 71 is required to become the S-polarized light at the time point when entering the first optical element 72 since the first optical element 72 reflects the blue light beam BLs from the first polarization split element 71, and transmits the blue light beam BLp from the diffusion plate 261.

Configuration of Second Polarization Split Element

The second polarization split element 73 is disposed at the +Z direction side of the first polarization split element 71. The yellow light beam YL enters the second polarization split element 73 along the +Z direction from the first polarization split element 71, and the second polarization split element 73 transmits the yellow light beam YLp as the P-polarized light toward the +Z direction, and reflects the yellow light beam YLs as the S-polarized light toward the +X direction. Therefore, in the case of the present embodiment, the second polarization split element 73 has a polarization split characteristic of transmitting the P-polarized light and reflecting the S-polarized light with respect to the light in the wavelength band including the green wavelength band and the red wavelength band. Since the blue light beams BLp, BLs do not enter the second polarization split element 73, the characteristic with respect to the blue light beams BLp, BLs of the second polarization split element 73 is not particularly limited.

Configuration of Second Optical Element

The second optical element 74 is disposed at the +X direction side of the second polarization split element 73. Further, the second optical element 74 is disposed at the +Z direction side of the first optical element 72. The yellow light beam YLs as the S-polarized light which enters the second optical element 74 along the +X direction from the second polarization split element 73 is reflected by the second optical element 74 toward the +Z direction. Further, the blue light beam BLp which enters the second optical element 74 along the +Z direction from the first optical element 72 is transmitted by the second optical element 74 toward the +Z direction. In the case of the present embodiment, the second optical element 74 has a characteristic of transmitting the P-polarized light with respect to the light in the blue wavelength band, and a characteristic of reflecting the S-polarized light with respect to the light in the wavelength band including the green wavelength band and the red wavelength band. Therefore, the second optical element 74 can be formed of a dichroic mirror for transmitting the light in the blue wavelength band, and reflecting the light in the wavelength band including the green wavelength band and the red wavelength band irrespective of the polarization direction.

Configuration of Wavelength Conversion Element

The wavelength conversion element 28 is disposed at the −Z direction side of the first polarization split element 71. The second light collection element 27 is disposed between the first polarization split element 71 and the wavelength conversion element 28 on the Z axis.

The yellow light beam YL emitted from the wavelength conversion element 28 is transmitted through the second light collection element 27 along the +Z direction, and is then transmitted through the first polarization split element 71. Out of the yellow light beam YL as the unpolarized light which has been transmitted through the first polarization split element 71 to enter the second polarization split element 73, the yellow light beam YLs as the S-polarized light is reflected by the polarization split layer 731 toward the +X direction, and is then emitted from the second polarization split element 73. The yellow light beam YLs as the S-polarized light emitted along the +X direction from the second polarization split element 73 is reflected toward the +Z direction by an optical layer 741 of the second optical element 74, and then enters the first color separation element 29.

Meanwhile, out of the yellow light beam YL as the unpolarized light having entered the second polarization split element 73, the yellow light beam YLp as the P-polarized light is transmitted through the polarization split layer 731 toward the +Z direction to enter the second color separation element 33 via the fourth retardation element 32.

Configuration of Diffusion Device

The diffusion device 26 is disposed at the −Z direction side of the first optical element 72. The first retardation element 24 is disposed between the first optical element 72 and the diffusion plate 261 on the Z axis. The blue light beams BLs as the S-polarized light enters the first retardation element 24 along the −Z direction from the first optical element 72. The first light collection element 25 is disposed between the first retardation element 24 and the diffusion plate 261 on the Z axis.

The blue light beam BLs as the S-polarized light emitted from the third retardation element 54 is reflected by the first optical element 72 to be converted by the first retardation element 24 into the blue light beam BLc1 as the circularly polarized light. The blue light beam BLc1 having entered the diffusion plate 261 is reflected by the diffusion plate 261 to thereby be converted into the blue light beam BLc2 as the circularly polarized light having an opposite rotational direction. The blue light beam BLc2 emitted from the diffusion device 26 reenters the first retardation element 24 to be converted into the blue light beam BLp as the P-polarized light. The blue light beam BLp as the P-polarized light is transmitted through the first optical element 72 and the second optical element 74 toward the +Z direction, and then enters the first color separation element 29.

Configuration of First Color Separation Element

As shown in FIG. 12, the first color separation element 29 is disposed at the +Z direction side of the second optical element 74. The configuration of the first color separation element 29 is substantially the same as the configuration of the first color separation element 29 in the first embodiment.

Configuration of Second Color Separation Element

As shown in FIG. 11, the second color separation element 33 is disposed at the +Z direction side of the second polarization split element 73. The configuration of the second color separation element 33 is substantially the same as the configuration of the second color separation element 33 in the first embodiment.

In the case of the present embodiment, as shown in FIG. 13, the red light beam RLs, the green light beam GLs, the yellow light beam YLs, and the blue light beam BLs emitted from the light source device 13 enter the first multi-lens 41. The red light beam RLs enters the plurality of lenses 411 included in the area A1 at the −X direction side and at the +Y direction side in the first multi-lens 41. The green light beam GLs enters the plurality of lenses 411 included in the area A2 at the −X direction side and at the −Y direction side in the first multi-lens 41. The yellow light beam YLs enters the plurality of lenses 411 included in the area A3 at the +X direction side and at the +Y direction side in the first multi-lens 41. The blue light beam BLs enters the plurality of lenses 411 included in the area A4 at the +X direction side and at the −Y direction side in the first multi-lens 41.

The rest of the configuration of the light source device 13 and the projector 1 is substantially the same as in the first embodiment.

Advantages of Third Embodiment

The light source device 13 according to the present embodiment is provided with the light source section 21 which emits the blue light beams BLp, BLs having the blue wavelength band and respectively including the P-polarized light and the S-polarized light, the first polarization split element 71 which transmits the blue light beam BLp as the P-polarized light entering the first polarization split element 71 along the +X direction from the light source section 21 toward the +X direction, and reflects the blue light beam BLs as the S-polarized light toward the −Z direction crossing the +X direction, the first optical element 72 which is disposed at the +X direction side of the first polarization split element 71, and reflects the blue light beam BLs entering the first optical element 72 along the +X direction from the first polarization split element 71 toward the −Z direction, the diffusion plate 261 which is disposed at the −Z direction side of the first optical element 72, diffuses the blue light beam BLc1 entering the diffusion plate 261 along the −Z direction from the first optical element 72, and emits the blue light beam BLc2 thus diffused toward the +Z direction as an opposite direction to the −Z direction, the wavelength conversion element 28 which is disposed at the −Z direction side of the first polarization split element 71, performs the wavelength conversion on the blue light beam BLs entering the wavelength conversion element 28 along the −Z direction from the first polarization split element 71 to emit the yellow light beam YL having the wavelength band different from the blue wavelength band toward the +Z direction, the second polarization split element 73 which is disposed at the +Z direction side of the first polarization split element 71, which the yellow light beam YL enters along the +Z direction from the first polarization split element 71, and which transmits the yellow light beam YLp as the P-polarized light toward the +Z direction, and reflects the yellow light beam YLs as the S-polarized light toward the +X direction, and the second optical element 74 which is disposed at the +X direction side of the second polarization split element 73, and reflects the yellow light beam YLs as the S-polarized light entering the second optical element 74 along the +X direction from the second polarization split element 73 toward the +Z direction, wherein the blue light beam BLp which enters the first optical element 72 along the +Z direction from the diffusion plate 261 is transmitted by the first optical element 72 toward the +Z direction, the yellow light beam YL which enters the first polarization split element 71 along the +Z direction from the wavelength conversion element 28 is transmitted by the first polarization split element 71 toward the +Z direction, and the blue light beam BLp which enters the second optical element 74 along the +Z direction from the first optical element 72 is transmitted by the second optical element 74 toward the +Z direction.

Also in the present embodiment, it is possible to obtain substantially the same advantages as in the first embodiment such as the advantage that it is possible to realize the light source device 13 capable of emitting the plurality of colored light beams made uniform in polarization direction without using the polarization conversion element narrow in pitch, the advantage that it is possible to achieve the reduction in size of the light source device 13 and the projector 1, and the advantage that it is easy to form the dielectric multilayer film, and it is possible to manufacture the optical element and the polarization split element which are low in cost, and excellent in light separation characteristic.

Further, the light source device 13 according to the present embodiment is further provided with the first retardation element 24 which is disposed between the first optical element 72 and the diffusion plate 261, and which the blue light beam BLs as the S-polarized light enters along the −Z direction from the first optical element.

According to this configuration, it is possible to convert the blue light beam BLc2 as the circularly polarized light having been emitted from the diffusion plate 261 with the first retardation element 24 into the blue light beam BLp as the P-polarized light, and make the result be transmitted through the first optical element 72 and the second optical element 74. Thus, it is possible to increase the use efficiency of the blue light beam BLc2 emitted from the diffusion plate 261.

Further, the light source device 13 according to the present embodiment is further provided with the third retardation element 54 which is disposed between the first polarization split element 71 and the first optical element 72, and converts the blue light beam BLp as the P-polarized light emitted along the +X direction from the first polarization split element 71 into the blue light beam BLs as the S-polarized light.

According to this configuration, it is possible to use an optical element which has the polarization split characteristic of transmitting the blue light beam BLp as the P-polarized light and reflecting the blue light beam BLs as the S-polarized light as the first optical element 72. Therefore, the configuration of the dielectric multilayer film constituting the first optical element 72 becomes simple, and the formation thereof becomes easy.

Fourth Embodiment

A fourth embodiment of the present disclosure will hereinafter be described using FIG. 14 and FIG. 15.

A light source device according to the fourth embodiment is substantially the same in basic configuration as that of the third embodiment, but is different in configuration of the reflecting element from that of the third embodiment. Therefore, the overall description of the light source device will be omitted.

Figure 14:
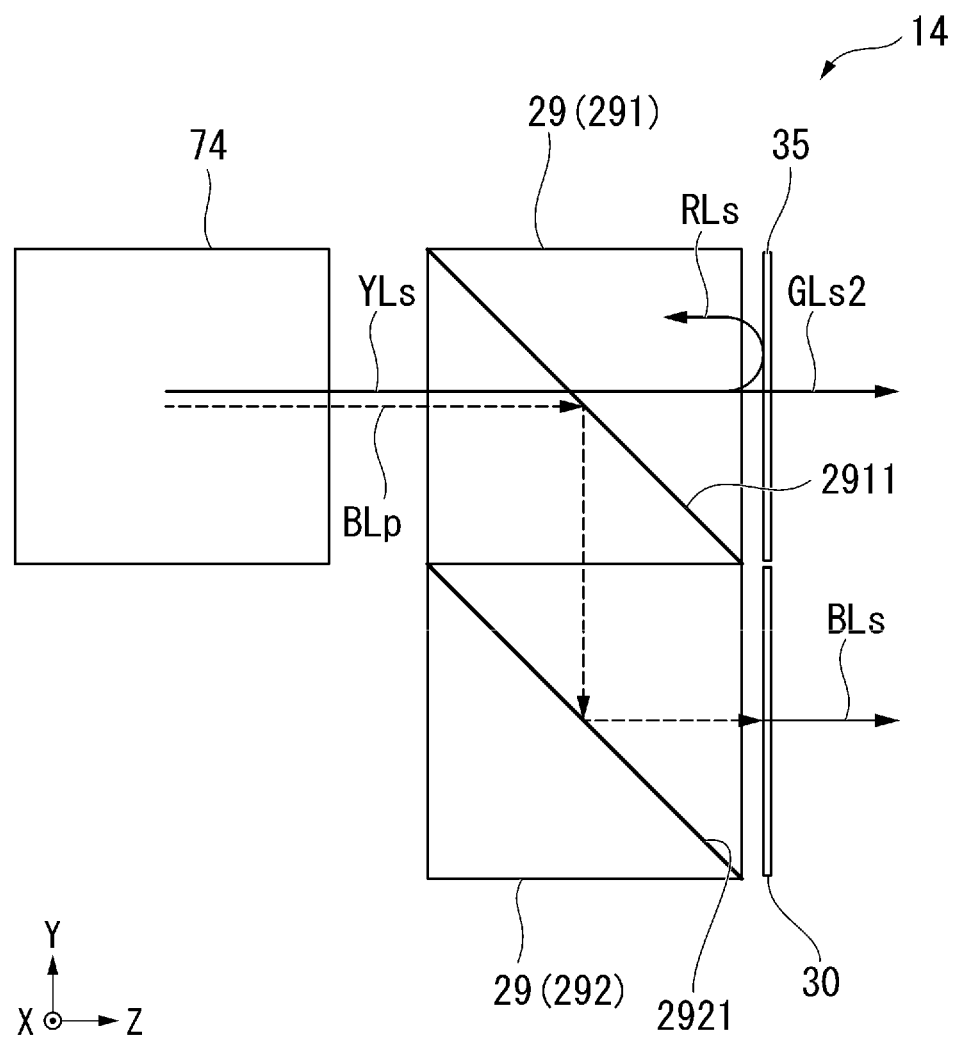
FIG. 14 is a side view of a light source device according to a fourth embodiment viewed from the –X direction.

FIG. 14 is a side view of a light source device 14 according to the fourth embodiment viewed from the +X direction. FIG. 15 is a schematic diagram showing positions of incidence of colored light beams on a multi-lens. In FIG. 14 and FIG. 15, the constituents common to the drawings used in the third embodiment are denoted by the same reference symbols, and the description thereof will be omitted.

As shown in FIG. 14, the light source device 14 according to the present embodiment is provided with a third color separation element 35 instead of the reflecting element in the light source device 13 according to the third embodiment. Specifically, the third color separation element 35 is disposed at the +Z direction side of the dichroic prism 291 on the light path of the yellow light beam YLs separated by the first color separation element 29. The third color separation element 35 is formed of a dichroic mirror having a characteristic of transmitting a green light beam GLs2 and reflecting the red light beam RLs. It should be noted that it is also possible to use a dichroic prism as the third color separation element 35 instead of the dichroic mirror.

Therefore, the green light beam GLs2 included in the yellow light beam YLs which enters the third color separation element 35 from the dichroic prism 291 of the first color separation element 29 is transmitted through the third color separation element 35 to be transmitted outside the light source device 14. In other words, the light source device 14 according to the present embodiment emits the green light beam GLs2 instead of the yellow light beam YLs from the position where the yellow light beam YLs is emitted in the light source device 13 according to the third embodiment.

Meanwhile, the red light beam RLs included in the yellow light beam YLs which enters the third color separation element 35 is reflected by the third color separation element 35 to enter the second optical element 74 from the −Z direction. The red light beam RLs returns to the wavelength conversion element 28 via the second polarization split element 73, the first polarization split element 71, and the second light collection element 27. The behavior of the red light beam RLs having returned to the wavelength conversion element 28 is substantially the same as in the second embodiment.

Figure 15:
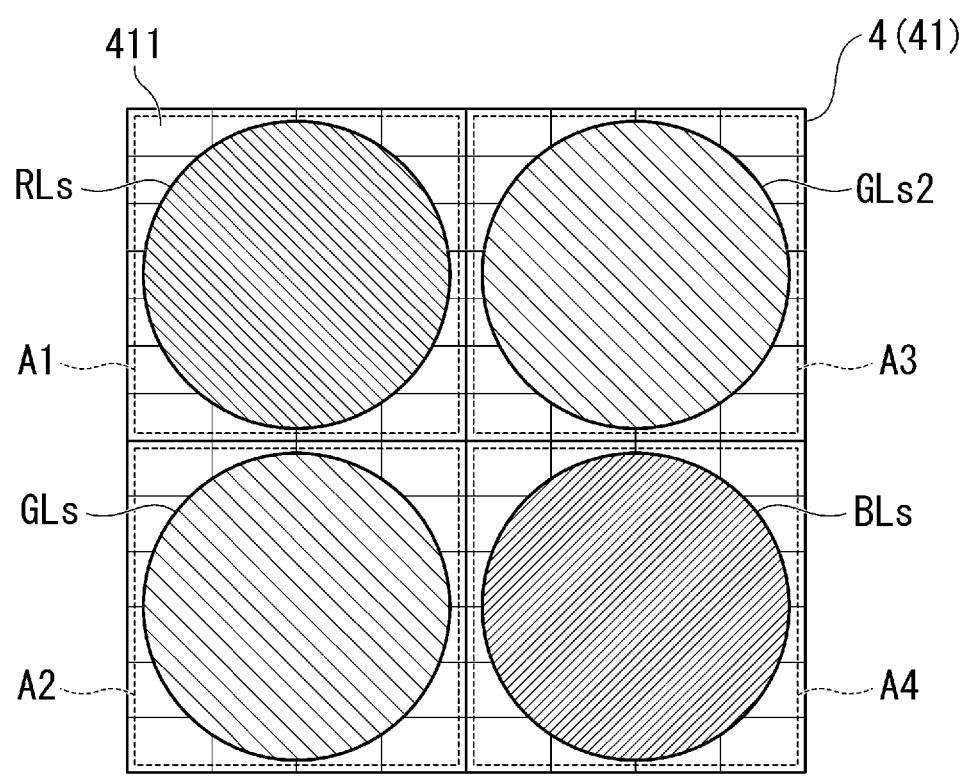
FIG. 15 is a schematic diagram showing positions of incidence of colored light beams on a multi-lens.

As shown in FIG. 15, the light source device 14 emits the red light beam RLs, the green light beam GLs, the green light beam GLs2, and the blue light beam BLs. The green light beam GLs2 is emitted from the position at the +X direction side and at the +Y direction side in the light source device 14, and then enters the plurality of lenses 411 disposed in the area A3 located at the +X direction side and at the +Y direction side in the first multi-lens 41. The green light beam GLs2 enters the microlenses 621 via the first multi-lens 41, the second multi-lens 42, the superimposing lens 43, and the field lens 5 similarly to the yellow light beam YLs in the third embodiment. The green light beam GLs2 having entered each of the microlenses 621 enters the third sub-pixel SX3 of the pixel PX corresponding to that microlens 621.

Advantages of Fourth Embodiment

Also in the present embodiment, it is possible to obtain substantially the same advantages as in the first embodiment such as the advantage that it is possible to realize the light source device 14 capable of emitting the plurality of colored light beams made uniform in polarization direction without using the polarization conversion element narrow in pitch, the advantage that it is possible to achieve the reduction in size of the light source device 14 and the projector 1, and the advantage that it is easy to form the dielectric multilayer film, and it is possible to manufacture the optical element and the polarization split element which are low in cost, and excellent in light separation characteristic.

Further, in the light source device 14 according to the present embodiment, since the green light beam GLs2 is emitted instead of the yellow light beam YLs in the light source device 13 according to the third embodiment, it is possible to increase the light intensity of the whole of the green light which enters the pixel PX. Thus, it is possible to increase the luminosity factor of the projection image.

It should be noted that it is possible to use a dichroic mirror having a characteristic of reflecting the green light beam GLp and transmitting the red light beam RLp as the third color separation element 35 in contrast to the present embodiment. In this case, by using a dichroic mirror having the characteristic described above, it is possible to make the red light beam enter the second sub-pixel SX2 and the fourth sub-pixel SX4 out of the four sub-pixels SX1 through SX4. Thus, it is possible to increase the color reproducibility of the projection image.

It should be noted that the scope of the present disclosure is not limited to the embodiments described above, but a variety of modifications can be provided thereto within the scope or the spirit of the present disclosure.

For example, in each of the embodiments, each of the first polarization split elements 51, 71, the first optical elements 52, 72, the second polarization split elements 23, 73, and the second optical elements 22, 74 can be formed of a plate type optical element, or can be formed of a prism type optical element.

In each of the embodiments described above, the light source device is provided with the first light collection element 25 and the second light collection element 27. However, this configuration is not a limitation, and at least one of the first light collection element 25 and the second light collection element 27 is not required to be disposed.

In each of the embodiments described above, the light source section 21 emits the blue light beams BLs, BLp toward the +X direction. However, this is not a limitation, and it is also possible to adopt a configuration in which the light source section 21 emits the blue light beams BLs, BLp in a direction crossing the +X direction, and the blue light beams BLs, BLp are reflected using, for example, a reflecting member, and are then made to enter the first polarization split element 51 in the +X direction.

In each of the embodiments described above, the projector 1 is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source device according to each of the embodiments described above emits the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source device emits three colored light beams, and the liquid crystal panel has three sub-pixels in each pixel. In this case, for example, in the light source devices according to the embodiments described above, a total reflection member can be disposed in the light path of the yellow light beam YLs.

The light source device according to the first embodiment and the third embodiment emits the blue light beam BLs, the yellow light beam YLs, the green light beam GLs, and the red light beam RLs which are each S-polarized light, and are spatially separated from each other. Further, the light source device according to the second embodiment and the fourth embodiment emits the blue light beam BLs, the green light beam GLs, and the red light beam RLs which are each S-polarized light, and are spatially separated from each other. Instead of these configurations, the polarization state of the colored light beams emitted by the light source device can be another polarization state. For example, it is possible for the light source device to have a configuration of emitting a plurality of colored light beams which are each P-polarized light, and are spatially separated from each other. Further, the colored light beams emitted by the light source device are not limited to the blue light beam, the yellow light beam, the green light beam, and the red light beam, but can also be other colored light beams. For example, the light source device can be provided with a configuration of emitting white light instead of the blue light and the yellow light.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

A light source device according to an aspect of the present disclosure may have the following configuration.

The light source device according to one aspect of the present disclosure includes a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction, a first optical element disposed at the first direction side of the first polarization split element, and configured to reflect the first light beam which enters the first optical element along the first direction from the first polarization split element toward the second direction, a diffusion element disposed at the second direction side of the first polarization split element, and configured to diffuse the first light beam which enters the diffusion element along the second direction from the first polarization split element, and emit the first light beam diffused toward a third direction as an opposite direction to the second direction, a wavelength conversion element disposed at the second direction side of the first optical element, configured to perform wavelength conversion on the first light beam which enters the wavelength conversion element along the second direction from the first optical element, and configured to emit a second light beam having a second wavelength band different from the first wavelength band toward the third direction, a second polarization split element which is disposed at the third direction side of the first optical element, which the second light beam enters along the third direction from the first optical element, and which is configured to transmit the second light beam polarized in the first polarization direction toward the third direction, and reflect the second light beam polarized in the second polarization direction toward a fourth direction as an opposite direction to the first direction, and a second optical element disposed at the fourth direction side of the second polarization split element, and configured to reflect the second light beam which enters the second optical element along the fourth direction from the second polarization split element, and is polarized in the second polarization direction, toward the third direction, wherein the first polarization split element transmits the first light beam which enters the first polarization split element along the third direction from the diffusion element toward the third direction, the first optical element transmits the second light beam which enters the first optical element along the third direction from the wavelength conversion element toward the third direction, and the second optical element transmits the first light beam which enters the second optical element along the third direction from the first polarization split element toward the third direction.

In the light source device according to the one aspect of the present disclosure, there may further be included a first retardation element which is disposed between the first polarization split element and the diffusion element, and which the first light beam emitted along the second direction from the first polarization split element enters.

A light source device according to another aspect of the present disclosure includes a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction, a first optical element disposed at the first direction side of the first polarization split element, and configured to reflect the first light beam which enters the first optical element along the first direction from the first polarization split element toward the second direction, a diffusion element disposed at the second direction side of the first optical element, and configured to diffuse the first light beam which enters the diffusion element along the second direction from the first optical element, and emit the first light beam diffused toward a third direction as an opposite direction to the second direction, a wavelength conversion element disposed at the second direction side of the first polarization split element, configured to perform wavelength conversion on the first light beam which enters the wavelength conversion element along the second direction from the first polarization split element, and configured to emit a second light beam having a second wavelength band different from the first wavelength band toward the third direction, a second polarization split element which is disposed at the third direction side of the first polarization split element, which the second light beam enters along the third direction from the first polarization split element, and which is configured to transmit the second light beam polarized in the first polarization direction toward the third direction, and reflect the second light beam polarized in the second polarization direction toward the first direction, and a second optical element disposed at the first direction side of the second polarization split element, and configured to reflect the second light beam which enters the second optical element along the first direction from the second polarization split element, and is polarized in the second polarization direction, toward the third direction, wherein the first optical element transmits the first light beam which enters the first optical element along the third direction from the diffusion element toward the third direction, the first polarization split element transmits the second light beam which enters the first polarization split element along the third direction from the wavelength conversion element toward the third direction, and the second optical element transmits the first light beam which enters the second optical element along the third direction from the first optical element toward the third direction.

In the light source device according to the another aspect of the present disclosure, there may further be included a first retardation element which is disposed between the first optical element and the diffusion element, and which the first light beam emitted along the second direction from the first optical element and polarized in the second polarization direction enters.

In the light source device according to the another aspect of the present disclosure, there may further be included a third retardation element disposed between the first polarization split element and the first optical element, and configured to convert the first light beam which is emitted along the first direction from the first polarization split element and is polarized in the first polarization direction into the first light beam polarized in the second polarization direction.

In the light source device according to the one aspect of the present disclosure, or the light source device according to the another aspect of the present disclosure, the light source section may include a light emitting element configured to emit light having the first wavelength band, and a second retardation element which the light having the first wavelength band emitted from the light emitting element enters, and which is configured to emit the first light beam including light polarized in the first polarization direction and light polarized in the second polarization direction.

In the light source device according to the one aspect of the present disclosure, or the light source device according to the another aspect of the present disclosure, the second retardation element may be made rotatable around a rotational axis along a proceeding direction of the light entering the second retardation element.

In the light source device according to the one aspect of the present disclosure, or the light source device according to the another aspect of the present disclosure, there may further be included a first color separation element disposed at the third direction side of the second optical element, and configured to separate light emitted from the second optical element into a third light beam having the first wavelength band and a fourth light beam having the second wavelength band, and a second color separation element disposed at the third direction side of the second polarization split element, and configured to separate light emitted from the second polarization split element into a fifth light beam having a third wavelength band different from the second wavelength band, and a sixth light beam having a fourth wavelength band different from the second wavelength band and the third wavelength band.

A projector according to an aspect of the present disclosure may have the following configuration.

The projector according to the aspect of the present disclosure includes the light source device according to the one aspect of the present disclosure, a light modulation device configured to modulate light from the light source device in accordance with image information, and a projection optical device configured to project the light modulated by the light modulation device.

In the projector according to the aspect of the present disclosure, there may further be included a homogenization device disposed between the light source device and the light modulation device, wherein the homogenization device may include a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the aspect of the present disclosure, the light modulation device may include a liquid crystal panel having a plurality of pixels, and a microlens array which is disposed at a light incident side of the liquid crystal panel, and has a plurality of microlenses corresponding to the plurality of pixels, the pixels may each include a first sub-pixel, a second sub-pixel, a third sub-pixel, and a fourth sub-pixel, and the microlens may make the third light beam enter the second sub-pixel, the fourth light beam enter the first sub-pixel, the fifth light beam enter the fourth sub-pixel, and the sixth light beam enter the third sub-pixel.

What is claimed is:
1. A light source device comprising:
a light source section configured to emit a first light beam which has a first wavelength band and includes light polarized in a first polarization direction and light polarized in a second polarization direction different from the first polarization direction;
a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction;
a first optical element disposed at the first direction side of the first polarization split element, and configured to reflect the first light beam which enters the first optical element along the first direction from the first polarization split element toward the second direction;
a diffusion element disposed at the second direction side of the first polarization split element, and configured to diffuse the first light beam which enters the diffusion element along the second direction from the first polarization split element, and emit the first light beam diffused toward a third direction as an opposite direction to the second direction;
a wavelength conversion element disposed at the second direction side of the first optical element, configured to perform wavelength conversion on the first light beam which enters the wavelength conversion element along the second direction from the first optical element, and configured to emit a second light beam having a second wavelength band different from the first wavelength band toward the third direction;
a second polarization split element which is disposed at the third direction side of the first optical element, which the second light beam enters along the third direction from the first optical element, and which is configured to transmit the second light beam polarized in the first polarization direction toward the third direction, and reflect the second light beam polarized in the second polarization direction toward a fourth direction as an opposite direction to the first direction; and
a second optical element disposed at the fourth direction side of the second polarization split element, and configured to reflect the second light beam which enters the second optical element along the fourth direction from the second polarization split element, and is polarized in the second polarization direction, toward the third direction, wherein
the first polarization split element transmits the first light beam which enters the first polarization split element along the third direction from the diffusion element toward the third direction,
the first optical element transmits the second light beam which enters the first optical element along the third direction from the wavelength conversion element toward the third direction, and the second optical element transmits the first light beam which enters the second optical element along the third direction from the first polarization split element toward the third direction.

2. The light source device according to claim 1, further comprising:

a first retardation element which is disposed between the first polarization split element and the diffusion element, and which the first light beam emitted along the second direction from the first polarization split element enters.

3. A light source device comprising:

a light source section configured to emit a first light beam which has a first wavelength band and includes light polarized in a first polarization direction and light polarized in a second polarization direction different from the first polarization direction;

a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction;

a first optical element disposed at the first direction side of the first polarization split element, and configured to reflect the first light beam which enters the first optical element along the first direction from the first polarization split element toward the second direction;

a diffusion element disposed at the second direction side of the first optical element, and configured to diffuse the first light beam which enters the diffusion element along the second direction from the first optical element, and emit the first light beam diffused toward a third direction as an opposite direction to the second direction;

a wavelength conversion element disposed at the second direction side of the first polarization split element, configured to perform wavelength conversion on the first light beam which enters the wavelength conversion element along the second direction from the first polarization split element, and configured to emit a second light beam having a second wavelength band different from the first wavelength band toward the third direction;

a second polarization split element which is disposed at the third direction side of the first polarization split element, which the second light beam enters along the third direction from the first polarization split element, and which is configured to transmit the second light beam polarized in the first polarization direction toward the third direction, and reflect the second light beam polarized in the second polarization direction toward the first direction; and a second optical element disposed at the first direction side of the second polarization split element, and configured to reflect the second light beam which enters the second optical element along the first direction from the second polarization split element, and is polarized in the second polarization direction, toward the third direction, wherein the first optical element transmits the first light beam which enters the first optical element along the third direction from the diffusion element toward the third direction, the first polarization split element transmits the second light beam which enters the first polarization split element along the third direction from the wavelength conversion element toward the third direction, and the second optical element transmits the first light beam which enters the second optical element along the third direction from the first optical element toward the third direction.

4. The light source device according to claim 3, further comprising:

a first retardation element which is disposed between the first optical element and the diffusion element, and which the first light beam emitted along the second direction from the first optical element and polarized in the second polarization direction enters.

5. The light source device according to claim 3, further comprising:

a third retardation element disposed between the first polarization split element and the first optical element, and configured to convert the first light beam which is emitted along the first direction from the first polarization split element and is polarized in the first polarization direction into the first light beam polarized in the second polarization direction.

6. The light source device according to claim 1, wherein the light source section includes a light emitting element configured to emit light having the first wavelength band, and a second retardation element which the light having the first wavelength band emitted from the light emitting element enters, and which is configured to emit the first light beam including light polarized in the first polarization direction and light polarized in the second polarization direction.

7. The light source device according to claim 6, wherein the second retardation element is made rotatable around a rotational axis along a proceeding direction of the light entering the second retardation element.

8. The light source device according to claim 1, further comprising:

a first color separation element disposed at the third direction side of the second optical element, and configured to separate light emitted from the second optical element into a third light beam having the first wavelength band and a fourth light beam having the second wavelength band; and a second color separation element disposed at the third direction side of the second polarization split element, and configured to separate light emitted from the second polarization split element into a fifth light beam having a third wavelength band different from the second wavelength band, and a sixth light beam having a fourth wavelength band different from the second wavelength band and the third wavelength band.

9. A projector comprising:

the light source device according to claim 1;

a light modulation device configured to modulate light from the light source device in accordance with image information; and a projection optical device configured to project the light modulated by the light modulation device.

10. The projector according to claim 9, further comprising:
- a homogenization device disposed between the light source device and the light modulation device, wherein
the homogenization device includes
  - a pair of multi-lenses configured to divide the light entering the pair of multi-lenses from the light source device into a plurality of partial light beams, and
  - a superimposing lens configured to superimpose the plurality of partial light beams entering the superimposing lens from the pair of multi-lenses on the light modulation device.

11. The projector according to claim 10, wherein
the light modulation device includes a liquid crystal panel
  having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes
  the third light beam enter the second sub-pixel,
  the fourth light beam enter the first sub-pixel,
  the fifth light beam enter the fourth sub-pixel, and
  the sixth light beam enter the third sub-pixel.

* * * * *